(12) United States Patent
Frank

(10) Patent No.: US 12,461,498 B2
(45) Date of Patent: Nov. 4, 2025

(54) ADVANCED METAL AIR ELECTROCHEMICAL CELL AND METHOD OF FABRICATION

(71) Applicant: Blue Horizons Innovations, LLC, Coconut Creek, FL (US)

(72) Inventor: David L. Frank, Highland Beach, FL (US)

(73) Assignee: Blue Horizons Innovations, LLC, Coconut Creek, FL (US)

( * ) Notice: Subject to any disclaimer, the term of this patent is extended or adjusted under 35 U.S.C. 154(b) by 16 days.

(21) Appl. No.: 18/488,238

(22) Filed: Oct. 17, 2023

(65) Prior Publication Data

US 2024/0255913 A1    Aug. 1, 2024

Related U.S. Application Data

(63) Continuation of application No. 17/819,128, filed on Aug. 11, 2022, now Pat. No. 11,687,052.

(60) Provisional application No. 63/430,102, filed on Dec. 5, 2022.

(51) Int. Cl.
| | |
|---|---|
| *G05B 19/042* | (2006.01) |
| *G08B 21/18* | (2006.01) |
| *G10L 15/22* | (2006.01) |
| *H01M 8/10* | (2016.01) |
| *H02J 7/34* | (2006.01) |

(52) U.S. Cl.
CPC ....... *G05B 19/0428* (2013.01); *G08B 21/185* (2013.01); *H01M 8/10* (2013.01); *H02J 7/345* (2013.01); *G05B 2219/24033* (2013.01); *G10L 15/22* (2013.01); *H02J 2207/50* (2020.01)

(58) Field of Classification Search
None
See application file for complete search history.

(56) References Cited

U.S. PATENT DOCUMENTS

| | | |
|---|---|---|
| 3,416,207 A | 12/1968 | Maida |
| 5,470,583 A | 11/1995 | Na et al. |
| 8,512,645 B2 | 8/2013 | Lee et al. |

(Continued)

OTHER PUBLICATIONS

Vasylkiv et al. Nano-Blast Synthesis of Nano-size $CeO_2$—$Gd_2O_3$ Powders. J. Am. Ceram. Soc., 89 [6] 1822-1826 (2006).
International Search Report mailed on Mar. 26, 2021 issued for International Application No. PCT/US20/61726.

(Continued)

*Primary Examiner* — Karie O'Neill Apicella
(74) *Attorney, Agent, or Firm* — Fleit Intellectual Property Law; Jose Gutman

(57) ABSTRACT

An advanced metal-air-electrochemical-cell includes a cathode with cathode material providing enhanced oxygen reduction reaction (ORR) and oxygen evolution reaction (OER). Examples of metal-air-electrochemical-cells are rechargeable metal-air batteries and metal-air fuel-cells. Metal air electrochemical cells can be based on a variety of metal fuels such as: aluminum, germanium, calcium, iron, lithium, magnesium, potassium, sodium, tin, and zinc. In various examples, a rechargeable metal-air-battery includes a configuration that allows an aftermarket replacement of electrolyte in the metal-air-battery thereby refreshing the metal-air battery to provide more discharge/charge cycles and extending the usable life of the metal-air battery. A metal-air-fuel-cell includes anode slurry material including metal particles and electrolyte that can be refreshed, in addition to refreshing the electrolyte, to enable refueling of the metal-air-fuel-cell.

16 Claims, 7 Drawing Sheets

(56) References Cited

U.S. PATENT DOCUMENTS

| | | |
|---|---|---|
| 8,512,672 B2 | 8/2013 | Lee et al. |
| 9,248,501 B1 | 2/2016 | Johannes et al. |
| 10,941,464 B1 | 3/2021 | Agarwal |
| 11,257,630 B2 | 2/2022 | Frank |
| 11,312,663 B2 | 4/2022 | Frank |
| 11,603,335 B2 | 3/2023 | Frank |
| 2002/0196957 A1 | 12/2002 | Andersen |
| 2006/0083694 A1 | 4/2006 | Kodas et al. |
| 2006/0120020 A1 | 6/2006 | Dowgiallo, Jr. |
| 2008/0003364 A1 | 1/2008 | Ginley et al. |
| 2008/0220153 A1 | 9/2008 | Mukherjee et al. |
| 2011/0171364 A1 | 7/2011 | Xing et al. |
| 2012/0171420 A1 | 7/2012 | Molins et al. |
| 2013/0320274 A1 | 12/2013 | Walters |
| 2014/0022694 A1 | 1/2014 | Reynolds et al. |
| 2014/0374642 A1 | 12/2014 | Shen et al. |
| 2015/0038593 A1 | 2/2015 | Gogotsi et al. |
| 2016/0038745 A1 | 2/2016 | Faltys et al. |
| 2017/0324057 A1 | 11/2017 | Friend et al. |
| 2018/0134563 A1 | 5/2018 | Mochalin et al. |

OTHER PUBLICATIONS

Written Opinion of the International Searching Authority mailed on Mar. 26, 2021.

Kan et al., "Battery Capacitor Combinations in Photovoltaic Powered Products", Journal of Power Sources 2006 pp. 1-9 entirety of document especially p. 1 paragraph 1, 2006.

Wikipedia "Ceramic Capacitor" Nov. 18, 2016 (Nov. 18, 2016) retrieved from <https://en.wikipedia.org/windex.php?title=Ceramic_capacitor&oldid=750236745> entirety of document especially p. 3 paragraph 5 2018.

Wikipedia "Sol-gel Process" Nov. 23, 2018 (Nov. 23, 2018) retrieved from <https://en.wikipedia.orgiw/index.php?title.Aluminum_oxide&oldid=870135592> entirety of document especially p. 3, Table 1 2018.

Wikipedia "Aluminum Oxide" Nov. 22, 2018 (Nov. 22, 2018) retrieved from <https://en.wikipedia.orgiw/index.php?title.Aluminium_oxide&oldid=870135592> entirety of document especially p. 3 Table 1 2018.

Wikipedia "Calcium copper Titanate" Nov. 28, 2017 (Nov. 28, 2017) retrieved from ,https://en.wikipedia.org/w/index.php?title=Calcium_copper_titanate&oldid=812515889. entirety of document especially p. 1 Table 1 2017.

PCT Notification of Transmittal of International Search Report and the Written Opinion of the International Searching Authority Sep. 1, 2020.

PCT Notification of Transmittal of International Search Report and the Written Opinion of the International Searching Authority May 27, 2021.

PCT Notification of Transmittal of International Search Report and the Written Opinion of the International Searching Authority Nov. 21, 2017.

Vander Wood, Tim, B. Report of Results: VA13345, TEM Characterization of Sintered Material. MVA Scientific Consultants, 9 pages, Oct. 9, 2019.

U.S. Appl. No. 63/356,534, Title: Enhanced Cathode for Metal Air Battery and Method of Fabrication. filed Jul. 27, 2023, Inventor David L. Frank.

ADVANCED METAL AIR ELECTROCHEMICAL CELL AND METHOD OF FABRICATION

FIELD OF THE DISCLOSURE

The present disclosure generally relates to an advanced metal-air-electrochemical cell technology enabling a rechargeable metal-air-battery and refuellable metal-air-fuel-cell and more particularly to an enhanced cathode material and various enhanced electrolytes for a metal air battery.

BACKGROUND

A metal-air-electrochemical-cell can be a battery or a fuel cell, typically oxygen molecules are reduced, by electrons from a current collector, and combined with metal dissolved in the electrolyte during discharging, and the reverse process occurs during charging.

Metal-air-batteries and fuel cells have been considerably hampered due to their inferior rate of oxygen diffusion capability, dendrites formation, corrosion of electrodes in the rechargeable metal-air-battery during electrochemical reactions, and slow kinetics of oxygen reactions at the cathode of the metal air battery.

Therefore, a need exists to overcome the problems with the prior art as discussed above.

BRIEF SUMMARY

In view that new cathode, electrolyte, and anode, materials and rechargeable metal-air-battery and metal-air-fuel-cell designs are required to enable effective metal air batteries and fuel cells, various examples of the present disclosure generally relate to a cathode material providing enhanced oxygen reduction reaction (ORR) and enhanced oxygen evolution reaction (OER). The enhanced cathode material can be applied in various battery technologies. One example includes an enhanced cathode material for a rechargeable metal-air-battery and metal-air-fuel-cell as will be discussed below. Another example includes an electrolyte selected from various enhanced electrolytes for the metal air battery and metal-air-fuel-cell. Another example includes the ability to refresh the electrolyte in a rechargeable metal-air-battery and to refresh both the electrolyte and anode material in a metal-air-fuel-cell, as will be discussed below.

According to one embodiment, an enhanced cathode material is applied in a rechargeable metal-air-battery. The enhanced cathode material can also be applied to fuel cells and energy storage technologies. Oxygen molecules are reduced by electrons from the current collector and combine with metal dissolved in the electrolyte during discharging, and the reverse process occurs during charging. In addition, the cathode material has strong capacitance to store energy when charging and release additional power on discharge.

The enhanced cathode material can also be applied in a Zinc-Air-Battery (ZAB) to enable a high energy density and cyclic stability at low costs, while avoiding various disadvantages such as sluggish reactions at the cathode and the formation of by-products at the cathode.

The enhanced cathode material can also be applied in a Zinc-Air-Fuel Cell (ZAFC) to enable a continuous power generation and high energy density and cyclic stability at low costs, while avoiding various disadvantages such as sluggish reactions at the cathode and the formation of by-products at the cathode.

Some embodiments apply various enhanced electrolytes for the metal air battery, as will be discussed below.

Various embodiments include an enhanced anode based on a nano particle design to provide reversible cycling performance of a rechargeable metal-air-battery.

In certain embodiments, the metal air battery comprises a Rechargeable Zinc Air Battery (R-ZAB).

Rechargeable zinc-air-batteries (R-ZAB) require improved cathode and anode materials to enable an effective and competitive rechargeable R-ZAB technology. To assist in resolving these issues, modified perovskite materials such as modified calcium copper titanate and modified calcium copper titanate with/aluminum oxide are proposed as an enhanced electrocatalysts for oxygen evolution/reduction (OER/ORR) reactions to improve zinc-air batteries (ZAB) and R-ZAB.

The Modified Calcium copper titanates, which can also be referred to as Modified CCTO (M-CCTO), cathode (air electrode), according to various embodiments, provides high capacitance and greater cyclic efficiency with minimum variations in both charge and discharge.

A ZAB has a theoretical energy density of 1353 Watt-hour per kilogram (Wh/kg), excluding oxygen, a theoretical working voltage of 1.65 V, and potentially very low fabrication cost. However, the current attainable energy density of a ZAB is around 450 Wh/kg. The average Coulombic efficiency of a ZAB is ~97.4%.

The present disclosure also relates to an increase in cell voltage for a rechargeable metal-air-battery based on novel designs of the rechargeable metal-air-battery cell, as will be discussed below.

Various embodiments provide for an asymmetric electrolyte design for the metal air battery cell that includes the enhanced cathode material, based on CCTO, as described above.

According to various embodiments, an air cathode applied is applied in a primary and secondary metal air battery where an enhanced air cathode comprises an air cathode layer including at least an electroconductive material combined with an enhanced electrocatalyst to improve oxygen evolution/reduction reactions that interface with the electrolyte.

The rechargeable metal-air-battery, according to various embodiments, comprises an advanced air cathode, an anode, and an electrolyte layer which is present between the air cathode and the anode and which conducts metal ions between the air cathode and the anode. The advanced air cathode is comprised of a gas diffusion layer, an electroconductive material and an electrocatalyst layer. The gas diffusion layer diffuses the oxygen in air providing oxygen to the electrocatalyst layer.

The electrolyte can include, for example, a liquid electrolyte, a gel-polymer, and a combination of gel-polymer on the cathode interface and an advanced solid polymer on the anode interface. An advanced solid polymer can be combined with a metal-organic-framework. An advanced solid polymer, as an example, comprises one or more polymers and conductive additives and deep eutectic solvent (DES), as will be discussed below.

The anode can be coated, in various embodiments, with a protective layer consisting of nano-sized hydrophilic metal-organic frameworks (MOFs) on the surface of the anode to improve physical and electrical interconnectivity between the electrolyte and the anode and reduce corrosion at the anode.

In another embodiment the anode can be coated with nano or micro particles to improve physical and electrical interconnectivity between the electrolyte and the anode and reduce corrosion at the anode.

The base electrocatalyst material in the electrocatalyst layer, according to various embodiments, comprises modified perovskite material including Calcium Copper Titanium Oxide ($Ca_jCu_kTi_lO_m$,) where j, k, l, and m, are within a range of 0 to 20. This modified perovskite material can also be referred to as Modified CCTO.

The base electrocatalyst material, in various embodiments, can be an internal barrier capacitor material having grain boundaries that provide electrocatalyst properties and first and second resistive materials bonded to the grain boundaries of the base material to form modified grain boundaries of the base electrocatalyst material.

One or more additional oxide materials, according to various embodiments, are bonded to the grain boundaries of the internal barrier capacitor material forming a grain boundary composition which includes nanoparticles of the first resistive material added to nanoparticles of the internal barrier capacitor material, increasing the electrocatalyst performance. The electrocatalyst material, in this example, is combined with active carbon and one or more ionomers to form the electrocatalyst layer.

The advanced electrocatalyst layer, in the example, interfaces with the electrolyte of the metal-air battery and performs the bifunctional processes of oxygen reduction reaction (ORR) forming hydroxyl ions which migrate into the electrolyte. A reversible reaction takes place at the electrocatalyst layer when charging release of $O_2$ molecules (OER).

The electrocatalyst, comprising a modified perovskite material, according to a fabrication process can be reduced in size of nanoparticle groupings to increase the electrocatalyst surface area improving performance using micro-combustions to reduce larger nanoparticle groupings to smaller nanoparticle groupings.

A first oxide material that can be added to the electrocatalyst material is an aluminum oxide, and a second resistive material is a silicon oxide.

The second oxide material, in the example, is bonded to grain boundaries of the grain boundary composition forming a modified internal barrier layer capacitor material which includes nanoparticles of the second resistive material added to nanoparticles of the grain boundary composition, increasing the electrocatalyst performance.

The calcium, copper, titanate can be combined with one or more of aluminum (Al), titanium (Ti), platinum (Pt), Platinum (Pt) alloys, Ruthenium (Ru), Carbon, Manganese (Mn), Magnesium (Mg), Strontium (Sr), iron, (Fe) and organic materials.

The modified internal barrier capacitor material has one or more element(s) formed around another element that is embedded within the one or more elements, forming a core shell element structure. See FIG. 4 showing an example of a core shell element structure.

The M-CCTO electrocatalyst material is deposited on a porous electrically conductive and hydrophobic material, such as nickel foam.

Using the advanced rechargeable metal-air-battery technology, based on the enhanced cathode and a zinc anode, as an example, a zinc-air-battery comprises the enhanced cathode and an anode comprising a core shell element structure of zinc/carbon nanoparticles (Zn/C) of less than 2 microns in diameter, which allows hydroxide ions to pass through the outer carbon shell while restricting the large zinc ions from passing through the shell thereby mitigating degradation and dendrite growth which improves rechargeability of the zinc-air-battery.

Using the advanced rechargeable metal-air-battery technology, as another example, a zinc-air-battery includes the enhanced cathode and an anode comprising the Zn/C nanoparticles in a shell core element structure. In this example, the performance of the zinc-air-battery can be improved by applying additional element structures to the outer carbon shell that help to further prevent dendrite formation at the zinc anode, such as nitrogen, sulfur, oxygen, conductive agents, metal hydroxides, metal oxides, metal alloys, or metal complexes.

According to another embodiment, the capabilities of the rechargeable metal-air-battery can be expanded to enable a metal-air-fuel-cell in which can be after-market replaced the electrolyte material and/or the anode material, to enable continuous operation and power production. An enhanced cathode material is applied in a metal-air-fuel-cell. Oxygen molecules are reduced by electrons from the current collector and combine with metal dissolved in the electrolyte during discharging, and the reverse process occurs during charging. In addition, the cathode material has strong capacitance to store energy when charging and release additional power on discharge. The anode, in certain embodiments, comprises an anode slurry where metal particles are suspended in an electrolyte. The anode slurry along with the electrolyte can both be replaced, either individually replaced or both collectively replaced, to refresh the metal-air-fuel-cell and enable continuous operation.

In the following embodiments, we provide several examples of zinc-air-battery configurations. The present invention is not limited to these examples.

BRIEF DESCRIPTION OF THE SEVERAL VIEWS OF THE DRAWINGS

The accompanying figures can include the same reference numerals that refer to identical or functionally similar elements throughout the separate views. These figures, together with the specification, which contains the detailed description below, serve to illustrate various embodiments and to explain different principles and advantages and are all incorporated into the present disclosure, in which.

DETAILED DESCRIPTION

Figure 1:
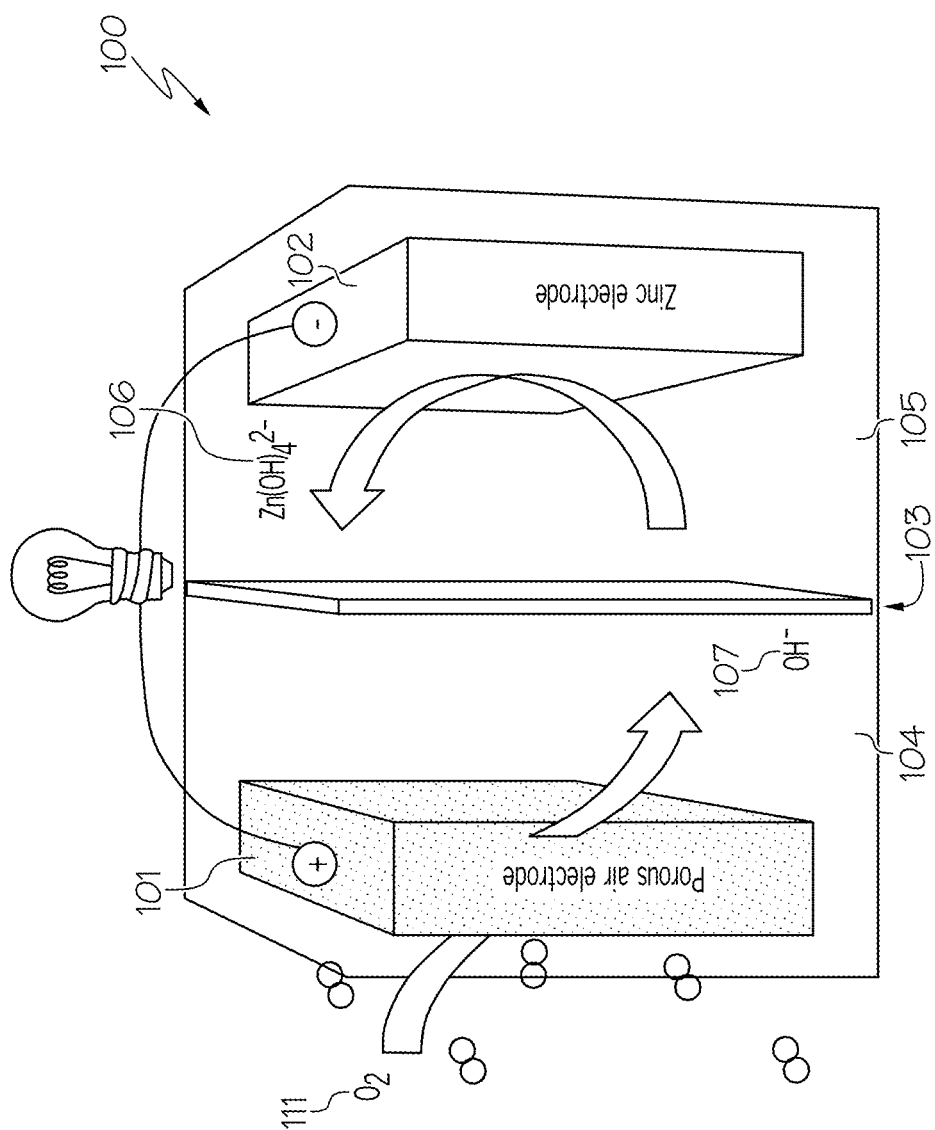
FIG. 1 is an illustrative example of a Rechargeable metal-air-battery with an enhanced cathode, according to various embodiments of the invention.

As required, this section discloses detailed embodiments; however, the disclosed embodiments are merely examples that illustrate systems and methods described below in various forms. Therefore, specific structural and functional details disclosed herein are only non-limiting examples provided as a basis for the claims and teaching one of ordinary skill in the art to variously employ the disclosed subject matter in virtually any appropriately detailed structure and function. Further, the terms and phrases used herein are not limiting but rather provide an understandable description.

Additionally, unless otherwise specifically expressed or clearly understood from the context of use, a term as used herein describes the singular and/or the plural of that term.

Non-Limiting Definitions

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically. The term "directly coupled", as used herein, is defined as directly connected with no intervening structures.

The term "ZAB", is intended to mean herein Zinc-Air Battery.

The terms "R-ZAB", "Rechargeable ZAB", and the like, are intended to mean herein Rechargeable Zinc-Air Battery.

The term "ZAFC" is intended to mean a Zinc-Air-Fuel Cell.

The terms "$CaCu_3Ti_4O_{12}/Al_2O_3$", "$CCTO/Al_2O_3$", and the like, are intended to mean herein a new perovskite material proposed as an enhanced electrocatalyst to improve zinc-air-batteries and rechargeable zinc-air batteries.

The terms "$CaCu_3Ti_4O_{12}/Al_2O_3$", "$CCTO/Al_2O_3$", and the like, are intended to mean herein a new perovskite material.

The term "ORR", and the like, is intended to mean herein oxygen reduction reaction.

The term "ORR", and the like, is intended to mean herein oxygen evolution reaction.

The terms "M-CCTO", "Modified CCTO", "modified perovskite material", and the like, are intended to mean herein a modified perovskite material comprised of Calcium Copper Titanium Oxide ($Ca_jCu_kTi_lO_m$,) where j, k, l, and m, are within the range of 0 to 20.

The term "CGER" is intended to mean herein a controlled gas evolution reaction.

The term "Metal Fuel" is intended to mean herein the metal applied as an anode in a metal-air-electrochemical-cell, metal air-battery, and metal-air-fuel-cell.

The term "configured to" is intended to mean herein a description of hardware, software, or a combination of hardware and software, set up, arranged, built, composed, constructed, designed, or that has any combination of these characteristics to carry out a given function. The term "adapted to" is intended to mean herein a description of hardware, software, or a combination of hardware and software, capable of performing, able to accommodate the performance of, that is suitable to perform, or that has any combination of the characteristics mentioned above to perform a given function.

The term "aftermarket" is intended to mean equipment (e.g., a metal-air battery), or a new component of equipment (e.g., one or more new electrolytes), installed after the initial product (or system) was manufactured and sold.

The term "retrofit" means an act of adding (or replacing) a new component (e.g., one or more new electrolytes) to a pre-existing something (e.g., a pre-existing metal-air battery) that did not have the new component (e.g., the one or more new electrolytes) when the something (e.g., the metal-air battery) was manufactured.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Overview and Introduction

In one embodiment, the present disclosure generally relates to an advanced electrocatalyst material for an enhanced electrocatalyst material applied to an air cathode providing increased performance in oxygen reduction reaction (ORR) and the oxygen evolution reaction (OER).

In one embodiment, we describe an advanced electrocatalyst applied to the cathode of a rechargeable Metal-Air Battery.

In another embodiment, we describe an advanced electrocatalyst applied to the cathode of a rechargeable Metal-Air-Fuel-Cell.

Various embodiments of both the rechargeable metal-air-battery and metal-air-fuel-cell comprise an air cathode, an anode, and one or more electrolyte layers which are present between the air cathode and the anode and which conduct(s) metal ions between the air cathode and the anode. A membrane is applied between the anode and cathode to restrict the materials that move from the cathode to the anode and the anode to the cathode.

The anode of the metal-air-electrochemical device (rechargeable metal-air-battery and metal-air-fuel-cell), according to various embodiments, comprises any one or more of the following metals: aluminum, germanium, calcium, iron, lithium, magnesium, potassium, sodium, tin, and zinc.

The advanced air cathode, according to one example, comprises an air diffusion layer, an electroconductive material, and an electrocatalyst layer. The air diffusion layer diffuses the oxygen in air providing oxygen to the electrocatalyst layer.

In one embodiment, the base electrocatalyst material in the electrocatalyst layer comprises a modified perovskite material comprised of Calcium Copper Titanium Oxide ($Ca_jCu_kTi_lO_m$,) where j, k, l, and m are within the range of 0 to 20. The base electrocatalyst material is an internal barrier capacitor material having grain boundaries and that provides electrocatalyst properties and first and second resistive materials bonded to the grain boundaries of the base electrocatalyst material to form modified grain boundaries of the base electrocatalyst material.

In another embodiment, one or more additional oxide materials are bonded to grain boundaries of the internal barrier capacitor material forming a grain boundary composition which includes nanoparticles of the first resistive material added to nanoparticles of the internal barrier capacitor material, increasing the electrocatalyst performance.

In another embodiment, the electrocatalyst material is combined with active carbon, one or more polymers, and one or more ionomers, to form the electrocatalyst layer.

In another embodiment, the electrocatalyst is applied to a metallic-organic-framework (MOF) that itself is an electrocatalyst, working in combination with the M-CCTO catalyst to further increase performance in an oxygen reduction reaction (ORR) and an oxygen evolution reaction (OER).

In another embodiment, the advanced electrocatalyst layer interfaces the electrolyte of the metal-air battery (e.g., a Zinc-Air Battery) and performs bifunctional processes (ORR/ERR) including oxygen reduction reaction (ORR) forming hydroxyl ions which migrate into the electrolyte.

In another embodiment, the advanced electrocatalyst layer interfaces the electrolyte of the metal-air-fuel-cell and performs bifunctional processes (ORR/ERR) including oxygen reduction reaction (ORR) forming hydroxyl ions which migrate into the electrolyte.

In another embodiment, a reversible reaction takes place at the electrocatalyst layer when charging the battery which releases oxygen ($O_2$) molecules (OER).

In another embodiment, the second oxide (resistive) material applied to the internal barrier layer material is bonded to grain boundaries of the grain boundary composition forming a modified internal barrier layer capacitor material which includes nanoparticles of the second oxide (resistive) material added to nanoparticles of the grain boundary composition, increasing the electrocatalyst performance. The use of oxide and resistive material are intended to be the same.

In another embodiment, a first oxide material to be added to the electrocatalyst material is an aluminum oxide and a second resistive material is a silicon oxide.

In another embodiment, the internal barrier layer material is combined with one or more of Al, Ti, Pt, Pt alloys, Ru, Carbon, Mn, Mg, Sr, and organic materials, or a combination thereof.

Figure 4:
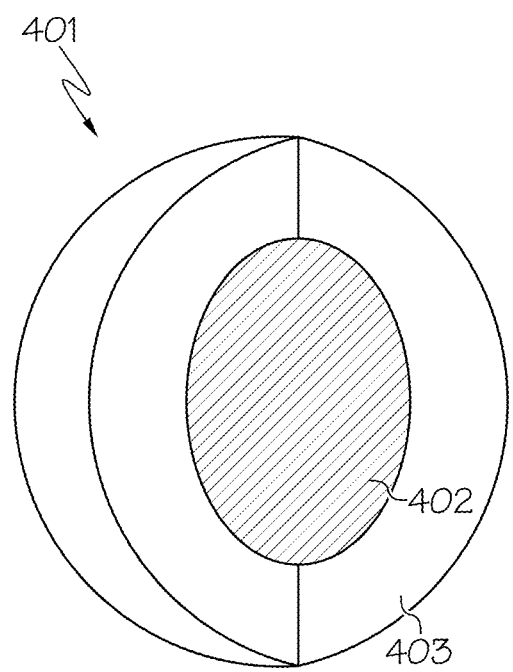
FIG. 4 illustrates an example of a core shell element structure of a zinc/carbon particle, according to various embodiments of the invention.

In another embodiment, the modified internal barrier layer material has one or more element(s) formed around another element that is embedded within the one or more elements, forming a core shell element structure. See FIG. 4 showing an example of a core shell element structure.

In another embodiment, the advanced electrocatalyst material is deposited on a porous electrically conductive and hydrophobic material, such as nickel foam.

In another embodiment, a zinc air battery uses the enhanced cathode and applied a core shell zinc anode of zinc/carbon nanoparticle (Zn/C) of less than 2 microns in diameter allowing the hydroxide ions to pass through the shell while restricting the large zinc ions from passing through mitigating degradation and dendrite growth.

The effectiveness of an air-cathode is based on several characteristics: porosity, surface area, porous mass activity, surface wettability, and particle agglomeration.

A wide variety of metals can be used to create a metal-air battery. Some examples of metal elements that can be used for this purpose are lithium, aluminum, magnesium, germanium, iron, zinc, calcium, sodium, potassium, and tin.

Zinc-Air-Batteries (ZAB) apply zinc as the metal element, which is used herein to describe various examples and benefits of an enhanced cathode in a metal-air battery, according to various embodiments of the invention. However, any other metal could be applied, instead of zinc, to the metal-air battery in various alternative embodiments.

Potentially exhibiting an excellent energy density of up to 1353 Wh/kg, zinc-air batteries perform five times better than lithium-ion batteries.

Zinc-Air Batteries can be affected by wettability issues. The pores in the porous electrode can be blocked by the electrolyte, reducing the rate of oxygen diffusion at the surface of the electrode.

To prevent electrolyte overflow into the electrode pores, hydrophobic additives such as Polyvinylidene fluoride (PVDF) and Polytetrafluoroethylene (PTFE) can be added to partly wet the electrode. Most of the electrocatalyst nanoparticles (e.g., 80% Pt) are found in the tiny primary holes of an electrode that serve as reaction volumes. In contrast, most of the Polytetrafluoroethylene (PTFE) is located in the bigger secondary pores of an electrode that act as pre-eminent gas routes.

$CaCu_3Ti_4O_{12}$ (CCTO) has bi-functional electrocatalyst and capacitance material properties. The synthesis processes used in various embodiments of the present invention enable a colossal dielectric permittivity ($\varepsilon$) up to 1,000·000. The addition of Aluminum oxide ($Al_2O_3$) to the CCTO material raises the capacitance and barrier layer resistivity and increases the electrocatalyst functions of M-CCTO.

Each oxygen atom in M-CCTO forms a strong covalent bond with an ion of A'-$Cu^{+2}$ and double ions of B—$Ti^{+4}$ enabling charge movement between A'-Cu and B—Ti ions which is important to an electrocatalyst.

Metal-Air Batteries are electrochemical cells that use an anode made from pure metal and an external cathode of ambient air, typically with an aqueous electrolyte. Herein also is described a gel or solid-state electrolyte.

During discharging of a metal-air electrochemical cell, a reduction reaction occurs in the ambient air cathode while the metal anode is oxidized.

$CCTO/Al_2O_3$ provides an enhanced bifunctional $O_2$ electrocatalyst which is used to catalyze both ORR/OER in rechargeable metal-air batteries and provides capacitance within the cathode.

Rechargeable metal-air batteries could be a promising energy source for a wide range of applications including electric vehicles, grid energy storage, stored energy backup, and more.

However, there are several significant challenges to be overcome in order to make the metal-air battery practical. These issues are discussed below.

1. The metal anodes react with the electrolyte to form a passivation layer called solid electrolyte interphase (SEI) film. This SEI film causes an irreversible loss in battery performance.
2. Dendrites can grow on anodes which can lead to an internal short circuit and explosion. The growth is the result of uncontrollable dissolution and deposition of metal anodes.
3. An electrolyte with all desired properties is required, including high stability, low volatility, non-toxicity and high oxygen solubility and wide electrochemical window.
4. The stability of cathode materials in metal-air batteries is another main challenge. This chemical instability leads to side reactions which are a major cause for performance loss and reduced cyclability of metal-air batteries.

According to various embodiments, an enhanced cathode material provides solutions to issue 4 above. In addition, the inventor has discovered solutions to increase the cell voltage of the metal-air battery and further to analyze resolutions to issues 1, 2 and 3 above.

Metals are typically used as active materials for negative electrodes in batteries. Recently, redox-active organic molecules, such as quinone-based and amine-based molecules, have been used as negative electrodes in rechargeable metal-air batteries with oxygen-reducing positive electrodes.

Here, protons and hydroxide ions participate in the redox reactions. While the performance characteristics are good the life cycle remains a problem.

Solid State battery technology incorporates solid metal electrodes as well as solid electrolyte.

Although chemistry is generally the same, solid-state designs avoid leakage and corrosion at the electrodes, which reduces the risk of fire and lowers design costs because it eliminates the need for safety features.

The solid electrolyte design also allows for a smaller form factor, meaning less weight. Most importantly, solid-state batteries are expected to overcome the current limitations of energy density.

The abundance, low cost, eco-friendliness, less toxicity, high stability in alkaline and aqueous medium, and are also the advantages of the zinc-air batteries, which makes them a promising option for clean energy storage Perovskite oxides work as electrocatalysts for oxygen reduction/evolution reactions (ORR/OER) and can be applied as enhancements for electrochemical energy conversion and energy storage and they are also inexpensive.

The M-CCTO electrocatalyst can be produced with independent particle sizes of less than 100 nm measured along a critical dimension of the particle.

Use of a particle reduction method is described below and in related U.S. Pat. No. 11,312,663, dated Apr. 26, 2022, the entire disclosure thereof being hereby incorporated by reference in its entirety. These reduced size particles maintain their separation as independent crystals. The M-CCTO electrocatalyst particles have an extremely high OOR/OER that is more powerful than other perovskites.

The M-CCTO material is a proven potential candidate for energy applications because of its high dielectric permittivity ($\varepsilon$) and occupies an improved ORR-OER activity with better onset potential, current density, and stability.

The addition of aluminum oxide ($Al_2O_3$) to the CCTO perovskite increases the ORR-OER function especially with the $Al_2O_3$ is applied in amounts greater than 10% and up to 85% by wt. $CCTO/Al_2O_3$ is a perovskite demonstrating enhanced ORR-OER function beyond CCTO and can be applied in both fuel cells and metal-air batteries.

In another embodiment, the M-CCTO electrocatalyst material is deposited on the porous air cathode, electrically conductive material, such as nickel foam. The CCTO particles may be deposited on the air interface or the electrolyte interface side of the porous air cathode.

Another embodiment of the invention includes an asymmetrical design of the metal-air battery cell that incorporates the enhanced cathode material stated above.

Figure 2:
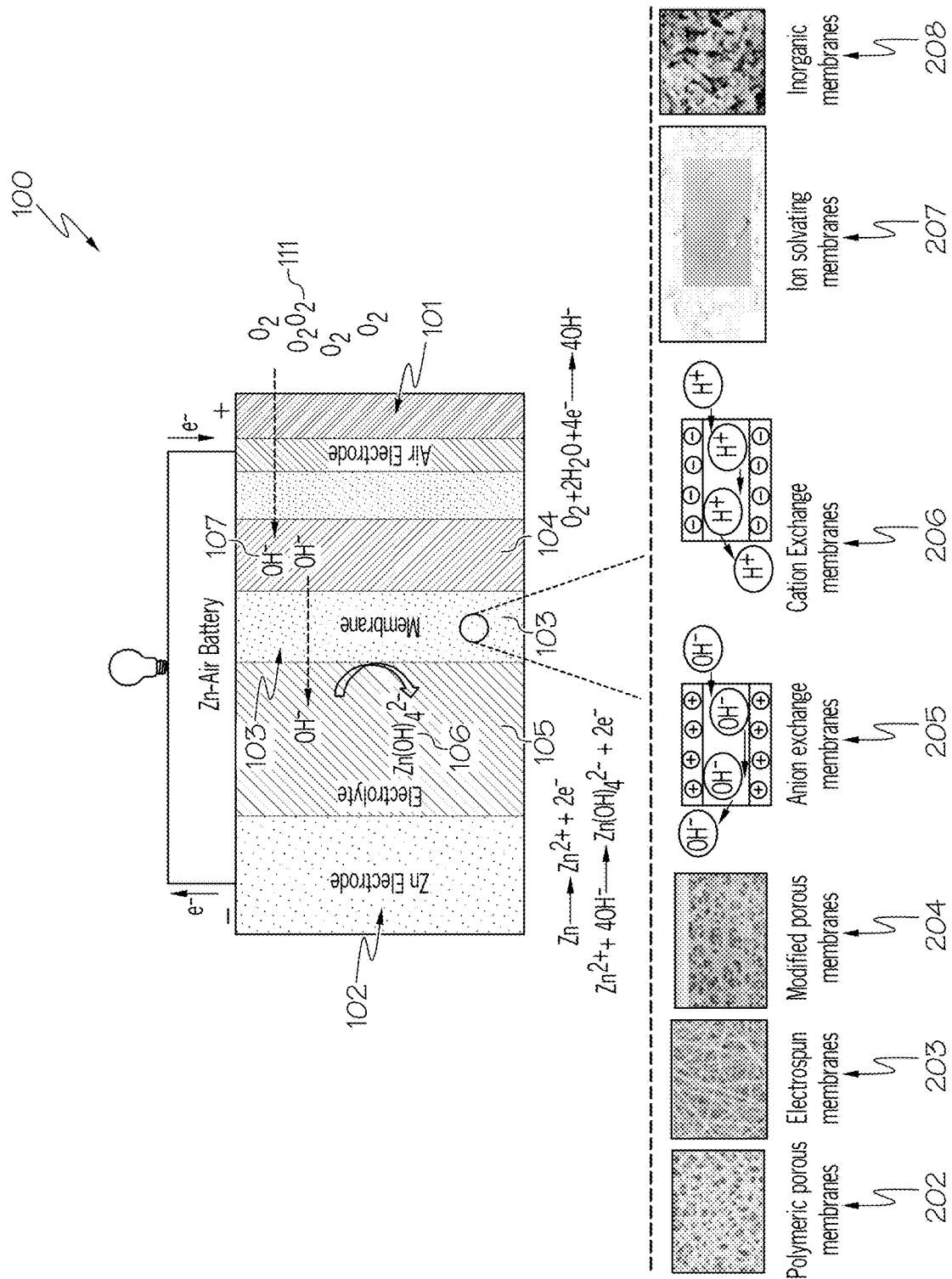
FIG. 2 illustrates various examples of separator membrane types for a Zinc-Air-Battery, according to various embodiments of the invention.

As shown in the example of FIG. 2, an ionically conductive membrane 103 separates the two sides of the metal-air battery 100. A Zinc-Air Battery is offered as a non-limiting example.

The ionically conductive membrane 103 separates two electrolyte types. A first electrolyte 105 interfaces to the air cathode 102. The first electrolyte 105 may be neutral or acidic. A second electrolyte 104 interfaces to the zinc anode 101. The second electrolyte 104 is alkaline. The electrolyte may be a hydrogel, a liquid, or a solid electrolytic material. The membrane 103 is a zinc ion exchange membrane, conducting zinc ions and holding the two electrolytes 104, 105, separate from each other.

The cathode side of the zinc-air battery enables higher voltages with the enhanced cathode and/or with the enhanced cathode coupled with the asymmetric electrolyte configuration.

The combined voltage of the zinc anode and air cathode enables a cell voltage of approximately 3.0 v.

Electrolytes for the Rechargeable Metal-Air-Battery and Metal-Air Fuel-Cell

In one embodiment, one or more electrolytes can be comprised of a liquid electrolyte, a gel-polymer, a combination of gel-polymer on the cathode interface and solid polymer on the anode interface, an advanced solid polymer combined with a metal-organic-framework, or an advanced solid polymer comprised of one or more polymers and conductive additives.

In another embodiment, a metal-air battery can use aqueous multiphase alkaline electrolytes, which are suitable for dendrite control at high current density. As illustrated in FIG. 1, according to various embodiments, the electrolytes 104, 105, are divided into homogeneous and heterogeneous phases by a hydrophilic polytetrafluoroethylene (PTFE) membrane 103.

The zinc electrode, as well as an electrode with oxygen evolution reaction (OER) activity, is placed in the heterogeneous phase solution for the charge process. The metal zinc would deposit in the spatially confined heterogeneous phase without entering the homogeneous solution.

The air electrode with oxygen reduction reaction (ORR) activity is assembled in the homogeneous phase, and contacts with air for the discharge process.

This dendrite-resistant battery delivers energy densities of 196.2 Wh/kg calculated according to the mass and volume of battery. An accelerated aging test shows excellent capacity retention as high as 100% after 10,000 rapid cycles at a current density of 50 mA cm. In the simulated conditions for utilization of intermittent energy resources, the ZABs maintain a remarkable reliability and responsiveness for more than 2000 discharge and charge cycles, exhibiting great potentials for large-scale energy storage.

Deep eutectic solvents (DES) are offered as an electrolyte for the metal air battery. DES has ionic liquid (IL) like physical properties, such as, extremely low vapor pressure, non-flammability and high ionic conductivity. DES's are inexpensive, non-corrosive, compatible with the electrode components, and eco-friendly, which enables sustainable and cost-efficient energy storage devices.

In one embodiment, an advanced rechargeable metal-air battery includes an electrolyte in the rechargeable metal-air battery that can be flushed and replaced when needed providing a fresh rechargeable metal-air-battery for continued use with a new round of recharge cycles. In certain embodiments, the electrolyte can be replaced while the rechargeable metal-air battery contemporaneously continues to be used in an application.

The rechargeable zinc-air battery, according to various embodiments, is designed with a deep eutectic solvent (DES) glycol-based electrolyte which preserves the cathode and zinc anode materials and provides excellent performance.

There can be water loss over time in liquid and/or semi-liquid electrolytes based on the fact that the zinc-air battery can be semi-exposed to the environment. This is referred to as Electrolyte Loss. There are a variety of measures to limit the evaporation and dry out of liquid and gel electrolytes which limits the life cycle of the zinc-air battery.

In another embodiment we have hydrophobic polymers in the air cathode that retain the small amount of water in our glycol based (DES) electrolyte.

In another embodiment, glycol in the electrolyte also works to reduce electrolyte loss.

In another embodiment, a rechargeable zinc-air-battery with a modified CCTO-based cathode, a zinc anode, and a liquid or semi-liquid electrolyte, can provide more than 1,000 recharge cycles.

In another embodiment, the internal components of a rechargeable zinc-air battery are preserved in the electrolyte. An example electrolyte is a glycol based (DES) electrolyte. Here, there is limited or no corrosion of the cathode or zinc anode with over 1,000 recharge cycles. Since the cathode, anode, and separator, are not diminished over the recharge cycles, when the electrolyte loss is an issue, one can simply flush out the old electrolyte and refill the rechargeable zinc-air battery with fresh (new) electrolyte and basically have a fresh battery with another round of recharge cycles. The flush and refill referred to as refueling can be performed more than 10 times. This greatly enhances the life cycle of a rechargeable zinc-air battery. The glycol based (DES) electrolyte is low cost, easy to make, and environmentally friendly. The Glycol (DES) electrolyte can also be recycled and used again.

Metal Air Battery Anode

In one embodiment, the anode for a metal air battery is coated with a protective layer consisting of nano-sized hydrophilic metal-organic frameworks (MOF's) on the surface of the anode to improve physical and electrical interconnectivity between the electrolyte and the anode.

In another embodiment, the anode comprises one or more of the following metals: aluminum, germanium, calcium, iron, lithium, magnesium, potassium, sodium, tin and zinc. These metals are also referred to herein as "Metal Fuel".

In another embodiment, for a zinc-air battery, when using of zinc foil as anode a metallic zinc is in surplus, which maintains a continuous zinc supply during its consumption by side reactions, whereas high charge/discharge rates are employed to improve its reduced reversible cycling performance.

The excessive zinc reservoir also masks problems of zinc anode degradation and results in a significant capacity decrease due to irreversible zinc consumption.

The zinc anode in a Zinc-Air Battery experiences degradation and dendrite formation restricts the rechargeability of the ZAB.

One embodiment for a zinc-air battery anode to address both degradation and dendrite growth is a core shell zinc/carbon nanoparticle (Zn/C). Nanoscale zinc oxide/carbon primary particles and/or particle groupings of less than 100 nm in size, measured along a critical dimension, provide improved cyclability which helps to preserve the zinc anode.

The Zn/C nanoparticles form a layered and porous electrode suppressing dendrite formation, improving the life cycle of the zinc-air-battery, and improving rechargeability.

Applying an outer coating (shell layer) encasing the zinc nanoparticle helps to minimize zinc dissolution confining larger zinc ions while allowing smaller hydroxide ions to pass through the shell. This helps to stabilize the anode in an alkaline electrolyte and resolves the impact of parasitic hydrogen evolution reaction in the zinc anode.

The Zn/C nanoparticle anode can be improved by applying additional structures to the outer carbon shell that help to further prevent dendrite formation at the zinc anode. Additives can include such as nitrogen, sulfur, oxygen, conductive agents, metal hydroxides, metal oxides, metal alloys, or metal complexes, or a combination thereof, applied to the Zn/C nanoparticles.

In another embodiment, a porous metal anode comprises metal foam that allows the electrolyte to absorb into a metal foam anode. In one example, nano porous zinc foam provides highly oriented crystals with higher surface area than conventional zinc in alkaline mediums. A zinc foam matrix is based on a three-dimension dendritic matrix at nanoscale. The anode material has a utilization of ~88% at full depth-of-discharge. The metal foam dendritic structure, as opposed to the flat material or particle material structure of a metal anode in a metal-electrochemical cell, works with the dendrite formations and significantly extends the life cycle of the anode with an expectation of hundreds of thousands of hours.

In another embodiment, a replenishment of the metal anode in addition to the use of an advanced air cathode that utilizes the M-CCTO catalyst, allows for a continuous (or a nearly-continuous) generation of power enabling a metal-air-fuel-cell.

Rechargeable Metal-Air-Battery-Fuel-Cell Anode

In one embodiment, an anode slurry reservoir feeds an anode slurry into the anode is position which is at the bottom of the metal-air-fuel-cell. The anode slurry is comprised of metal fuel particles suspended in an electrolyte fluid (referred to herein as "anode slurry" or "anode slurry material"). The anode slurry flows into and across the bottom of the metal air fuel-cell at scheduled times and is allowed to settle and coat on one or more anode current collector(s). The anode slurry flows through the anode area and the one or more current collectors to flush out the used anode slurry and move new anode slurry to settle and coat on the one or more anode current collector(s). An optional membrane can be placed to separate the anode slurry from an electrolyte that interfaces the anode.

The metal particles (Metal Fuel) in the metal fuel slurry, according to various embodiments, are comprised of one or more of the following metals: aluminum, germanium, calcium, iron, lithium, magnesium, potassium, sodium, tin and zinc.

Each of these particles may have a coating to reduce or prevent dendrite formation.

The electrolyte in the anode slurry is fluid and can be based on an aqueous or gel type electrolyte depending on the desired viscosity.

The metal particles in the anode slurry can form dendrites and other corrosive materials. The used anode slurry can be recycled by heating the slurry causing the dendrite formations on the metal particles (e.g., the dendrite formations of the metal) to fuse and melt while any corrosion along with the electrolyte is evaporated. The recycled particles can then be applied to a fresh electrolyte solution forming anode slurry ready for use in a metal-air-fuel-cell.

An advanced metal-air-fuel-cell comprising:
one or more advanced air cathodes, an anode, a separator, and one or more electrolyte layers which are interposed between the advanced air cathode and the anode, and which conduct metal ions between the advanced air cathode and the anode,
wherein the advanced air cathode includes a gas diffusion layer, an electroconductive material, and an electrocatalyst layer; and
wherein the gas diffusion layer diffuses oxygen from ambient air providing oxygen to the electrocatalyst layer; and an advanced electrocatalyst being applied to the advanced air cathode of the advanced rechargeable metal-air battery:
wherein a base electrocatalyst material in the electrocatalyst layer is comprised of a modified perovskite material comprised of Calcium Copper Titanium Oxide ($Ca_jCu_kTi_lO_m$,) where j, k, l, and m, are within a range of 0 to 20; and
wherein the base electrocatalyst material is an internal barrier capacitor material having grain boundaries that provide electrocatalyst properties and first and second resistive materials bonded to the grain boundaries of the base electrocatalyst material to form modified grain boundaries of the base electrocatalyst material thereby forming a modified internal barrier capacitor material; and
wherein one or more additional oxide materials are bonded to the grain boundaries of the internal barrier capacitor material forming a grain boundary composition which includes nanoparticles of a first resistive material added to nanoparticles of the internal barrier capacitor material, increasing performance of the advanced electrocatalyst; and
wherein the base electrocatalyst material is combined with active carbon and one or more ionomers to form the electrocatalyst layer, and
wherein the electrocatalyst layer interfaces with electrolyte of the one or more electrolyte layers of the advanced rechargeable metal-air battery and performs bifunctional processes of oxygen reduction reaction (ORR) forming hydroxyl ions which migrate into the electrolyte; and
wherein a reversible reaction takes place at the electrocatalyst layer when charging release of $O_2$ molecules (OER); and
wherein the electrolyte comprises one or more selected from:
a liquid electrolyte,
a gel-polymer electrolyte,
a combination of gel-polymer on an interface of the advanced air cathode and solid polymer on an interface of the anode, an advanced solid polymer combined with a metal-organic-framework,
an advanced solid polymer comprised of one or more polymers and conductive additives, or a deep eutectic solvent; and
wherein the metal anode is replenished to enable continuous power generation; and
wherein the metal anode is comprised of an anode slurry of metal-particles suspended in an electrolyte, and
wherein the metal particles consist of one or more of the following metals: aluminum, germanium, calcium, iron, lithium, magnesium, potassium, sodium, tin, and zinc.

In one embodiment, an anode slurry further comprises a metal particle slurry including metal particles (Metal Fuel) that are suspended in an aqueous electrolyte and come into contact with one or more charge collectors (electrodes) to provide a replaceable anode in a metal-air-fuel-cell, and where one or more gelling agent(s) are applied to assist in suspending the dense metal particles, enhance electrochemical performance, and help establish the desired metal slurry viscosity for the replaceable anode slurry in a metal-air-fuel-cell.

In another embodiment, the anode slurry further comprises metal particle sizes that range from 10 nanometers to 100 microns.

In another embodiment, the gelling agents that are applied to a metal air fuel cell slurry comprise polyacrylic acid an anionic polyelectrolyte and magnesium aluminum silicate clay which is a gel forming clay that reduces anode corrosion and enhances electrochemical performance.

In another embodiment, an aqueous electrolyte for a magnesium-air-fuel-cell is based on high conductivity alkaline electrolytes such as KOH, LiOH and NaOH.

In another embodiment, the gelling agents that are applied to a zinc slurry for a zinc-air-fuel-cell comprise polyacrylic acid an anionic polyelectrolyte and magnesium aluminum silicate clay which is a gel forming clay that reduces anode corrosion and enhances electrochemical performance.

In another embodiment, the electrolyte for a zinc-air-fuel-cell is based on high conductivity alkaline electrolytes such as KOH, LiOH and NaOH.

Membrane Separators

Membrane separators are one of the critical components in metal-air batteries and in metal-air-fuel-cells. In the control of mass transfer, and hence, electrochemical reaction, membrane separators have an important role to play.

The function of the separator typically is to prevent cross-mixing of the positive and negative electrolytes but to still allow the transport of ions for completion of the circuit during the passage of current.

In one embodiment, the separator for Zinc-Air Batteries is usually a porous polypropylene membrane with the porosity of 10-20 μm. The porosity of these membranes results in their high ionic conductivity, which typically is important for a separator material.

The membrane (separator) in a Zinc-Air Battery allows the transport of OH" ions between the air cathode electrode and the Zn anode electrode while providing a physical barrier between the two electrodes in order to prevent electrical short circuits. The performance of this battery is greatly affected by the chemical properties of the employed membrane.

In another embodiment, a polymer electrolyte can provide a dual purpose as the electrolyte and the separator.

Flexible ZAB

Flexible rechargeable Zinc-Air-Batteries receive tremendous interest in next-generation electrochemical energy storage and conversion devices, such as roll-up displays, flexible cell phones, and intelligent bracelets.

The flexible all-solid-state zinc-air batteries exhibit excellent power density (83.5 mW $cm^2$), high specific capacity (~600 mAh g), outstanding 35 hours of stable voltage, flexibility and excellent tolerance toxicity of $CO_2$. The flexible Zinc-Air Battery also shows high working voltage and excellent charge-discharge cycle stability, which further enlarges the application scope of the flexible battery.

In FIG. 1, an example of a zinc-air battery configuration 100 is shown, according to various embodiments. During discharge, a mass of zinc particles forms a porous anode 102, which is saturated with an electrolyte 105. Oxygen 111 from the air 111 reacts at the cathode 101 and forms hydroxyl ions 107 which migrate into the zinc and form zincate 106, releasing electrons to travel to the cathode 101. The zincate decays into zinc oxide and water returns to the electrolyte. A separator 103 electrically separates the cathode 101 and anode 102 while allowing ions to pass through.

The water and hydroxyl from the anode 102 are recycled at the cathode 101, so the water is not consumed. The reactions produce a theoretical voltage of 1.65 Volts, but it is reduced to 1.35 to 1.4 V in conventional cells. Various embodiments of the present invention increase the voltage between 2.0 volts to 3.2 volts.

FIG. 2 illustrates various example types of separators 103 (also referred to as membranes 103) applied in a Zinc-Air Battery.

While the following list does not limit the various types of membranes that can be applied in a metal-air battery, several examples of the types of membranes shown in FIG. 2 include: polymeric porous membranes 202, electrospun membranes 203, modified porous membranes 204, anion exchange membranes 205, cation exchange membranes 206, ion solvating membranes 207, and inorganic membranes 208.

Figure 3:
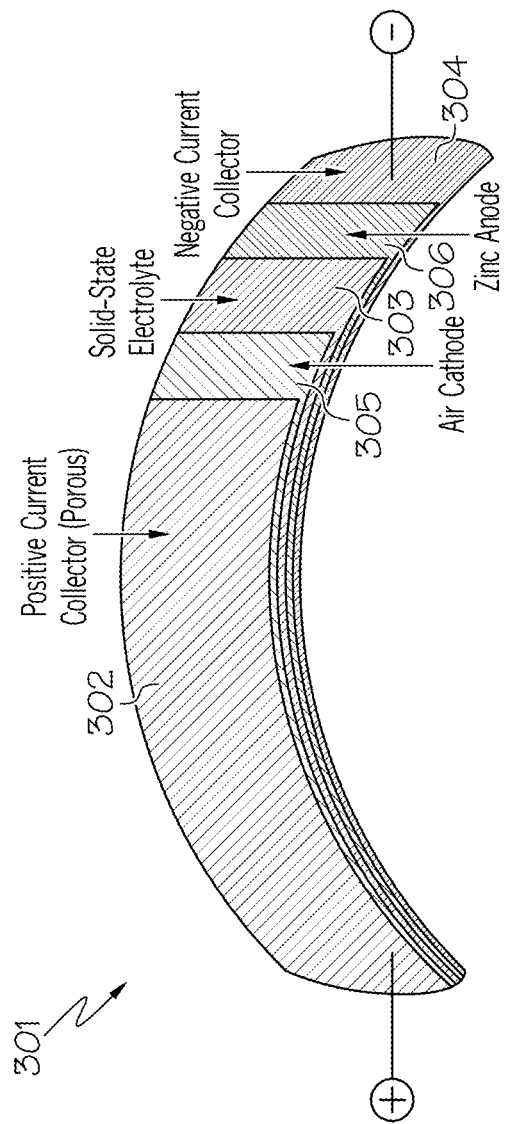
FIG. 3 illustrates an example of a flexible Zinc-Air-Battery, according to various embodiments of the invention.

FIG. 3 illustrates an example flexible Zinc-Air Battery 301 with a cathode 305 providing air conversion to oxygen. The example flexible Zinc-Air Battery 301 includes: a solid-state electrolyte 303 coupled to an air cathode 305, the air cathode 305 is coupled to a positive current collector 302. Additionally, as shown in FIG. 3, the solid state electrolyte 303 is coupled to a Zinc anode 306 which is coupled to a negative current collector 304. The solid-state electrolyte 303 also acts as a separator and provides an interface to both the air cathode 305 and the Zinc anode 306.

FIG. 4 illustrates an example core shell particle 401. This particle 401 includes a zinc core 402 with a carbon shell 403.

In various embodiments, a modified CCTO catalyst is reduced to nanoparticles using a controlled gas evolution reaction (CGER). The CGER uses, for example, a small amount of nitric acid mixed with ethanol in a ratio of between 1:1 and 10:1, which creates low temperature micro-combustions without flame, that separate larger sized nanoparticle clusters and yield smaller sized groupings of nano particles.

In one example embodiment, one or more calcined nanoparticle groupings (e.g., material including one or more agglomerated nanoparticles and/or aggregated nanoparticles) are placed into a nitric acid solution.

Then, ethanol fuel is added causing a controlled gas evolution reaction and subsequent near room temperature micro-combustions that break apart the nanoparticle groupings into smaller size groupings and/or separate primary nanoparticles.

A CGER fluid may contain a nitrate.

A CGER fluid may contain an acid such as nitric acid.

A CGER fluid may contain an amino acid such as but not limited to glycine.

A fuel could include ethanol, methanol, or propanol, or a combination thereof.

The one or more calcined nanoparticle groupings could be applied to an acid bath such as a nitric acid to start to break up the nanoparticle grouping and absorb in between the nanoparticles in the grouping. Then, a fuel and or other chemical constituents are added to complete the combustion formula and cause a combustion reaction to break apart the nanoparticle clusters.

According to various embodiments, a CGER combustion process is not used to synthesize new materials but to separate nanoparticles that are already formed and grouped into hard nanoclusters such as agglomerates or aggregates. An example CGER combustion process can be used to break apart nanoparticle groupings.

As discussed above, an example nanoparticle can be a nanoparticle of CCTO, which is a perovskite material.

The CCTO nanoparticles, after being broken apart into smaller size groupings and/or separate primary nanoparticles, may be applied as an improved electrocatalyst material with increased surface area.

The nanoparticles can be broken down to primary particles and/or particle groupings of less than 100 nm in size measured along a critical dimension of a nanoparticle grouping.

Figure 5:
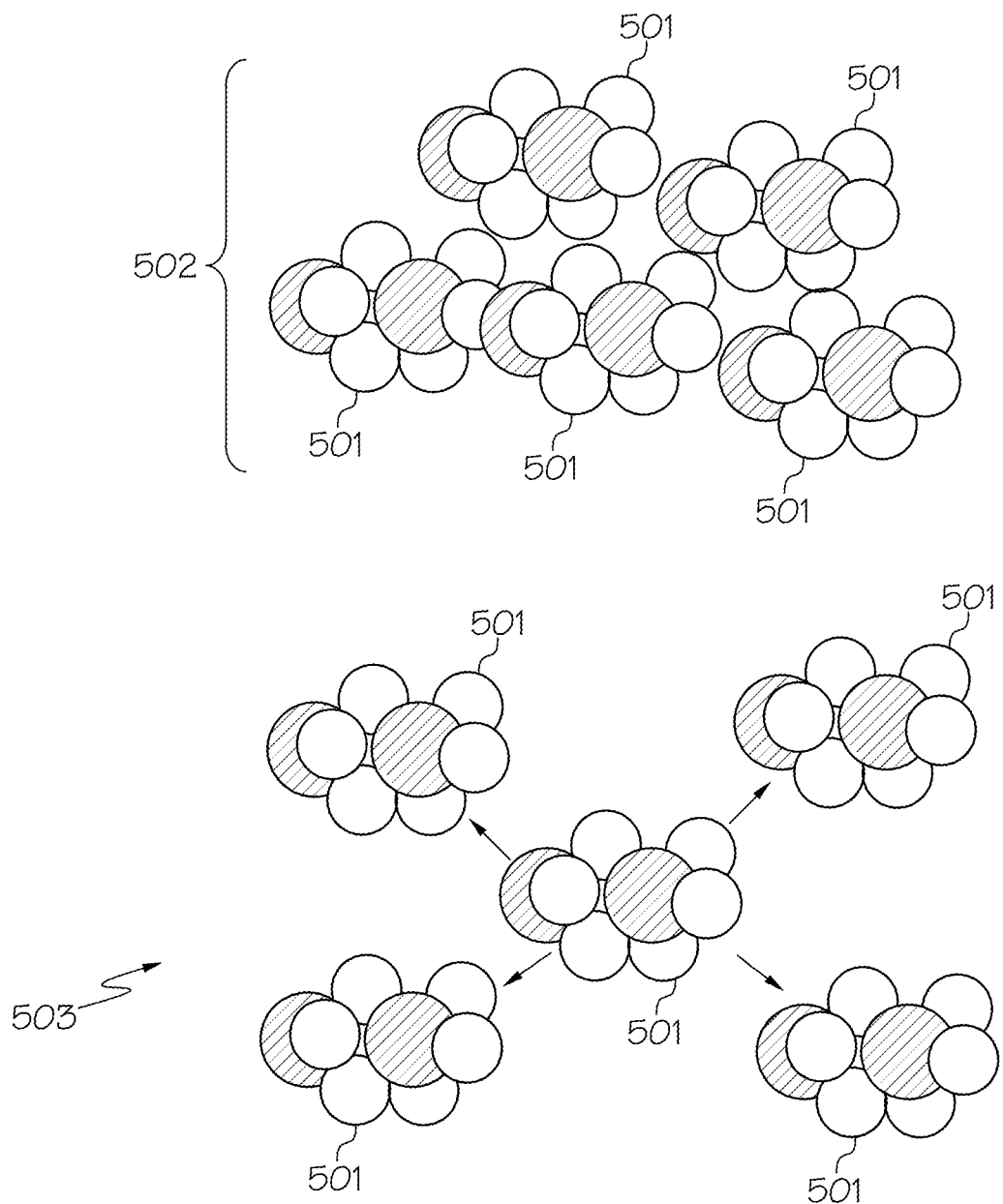
FIG. 5 illustrates an example of a controlled gas evolution reaction (CGER) nano particle reduction.

FIG. 5 illustrates an example of a group of primary nanoparticles 501 forming a larger nanoparticle cluster 502 comprising one or more nanoparticle aggregate(s) and/or one or more nanoparticle agglomeration(s). The nanoparticle aggregate(s) and/or agglomerated nanoparticles are shown clustered as a nanoparticle cluster 502, which may also be referred to as a nanoparticle agglomeration, or a nanoparticle aggregation, or the like.

FIG. 5 also illustrates the separation 503 of one or more nanoparticle aggregate(s) and/or one or more nanoparticle agglomeration(s) into smaller sized groups of nanoparticles including one or more primary nanoparticles 501, for example based on combustion processing of the one or more nanoparticle aggregate(s) and/or one or more nanoparticle agglomeration(s). The separated smaller sized groups of nanoparticles including one or more primary nanoparticles 501 are shown to be separated (e.g., combusted 503) from a larger nanoparticle cluster, nanoparticle agglomeration, or nanoparticle aggregation.

The one or more nanoparticle aggregate(s) and/or one or more nanoparticle agglomeration(s) can be separated into smaller groups of nanoparticles, including one or more primary nanoparticles 501, by for example breaking down ionic bonds between the nanoparticles.

Figure 6:
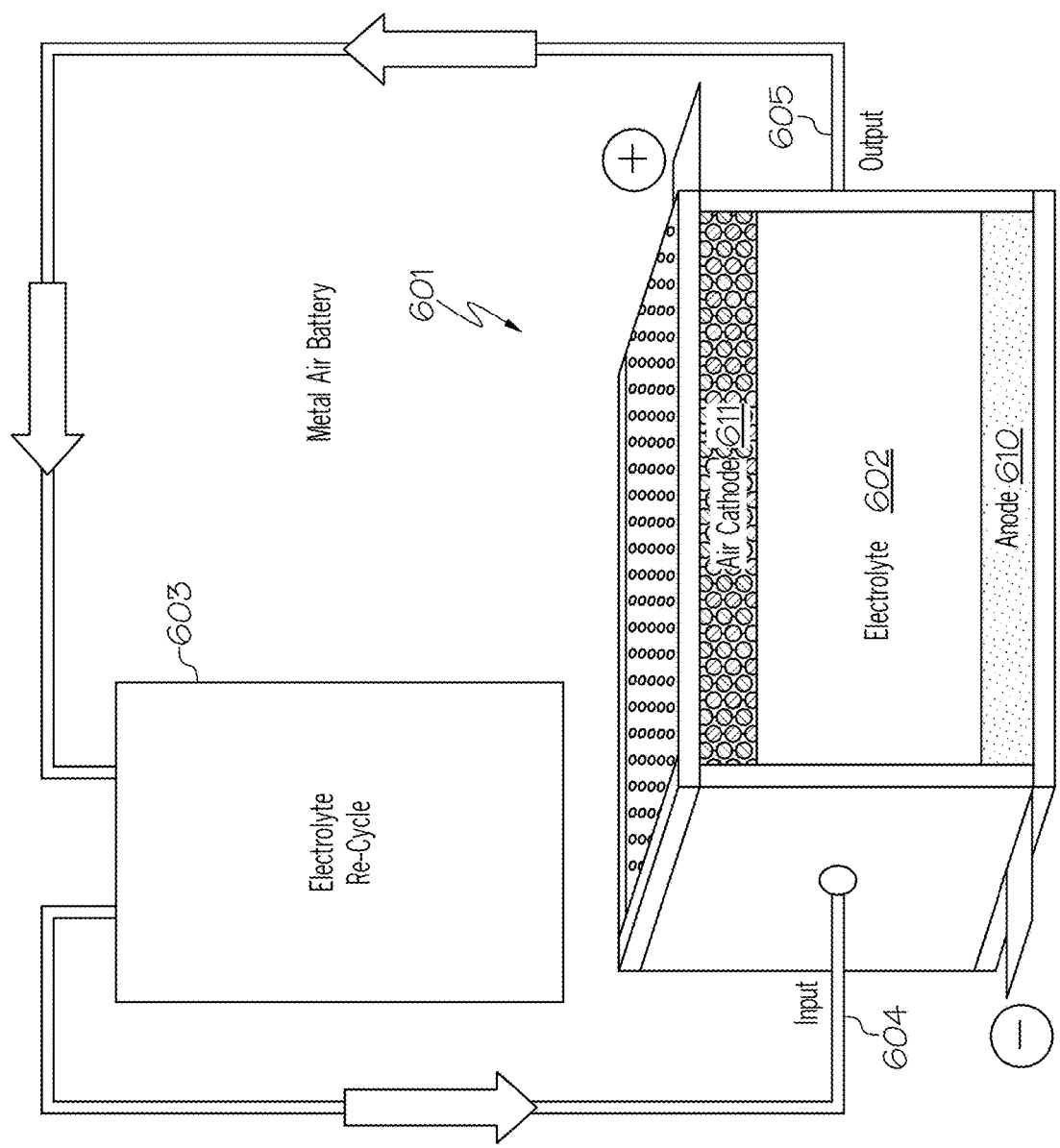
FIG. 6 illustrates an example of an electrolyte replacement process, according to various embodiments of the invention.

FIG. 6 illustrates a replacement process for replacing the electrolyte 602 in an electrolyte reservoir in a rechargeable metal-air-battery (e.g., an aftermarket rechargeable zinc-air battery) 601 in which the electrolyte 602 separates an air cathode 611 from an anode 610. The replacement can take place, for example, once the electrolyte 602 has experienced electrolyte loss or loss of liquid and is not performing within required levels. The replacement electrolyte, in one example process, flows into the electrolyte reservoir in the metal-air battery 601 through an input port 604. The old (non-performing) electrolyte 602 flows out of the electrolyte reservoir in the metal-air battery 601 via an output port 605. The old electrolyte that flows out of the battery can be captured in a storage reservoir (e.g., the storage reservoir being external to an aftermarket rechargeable zinc-air battery) and recycled 603 for reuse, as shown in FIG. 6. According to one example process, a pump mechanism (not shown), which can include one or more pumps, can be used to cause the replacement electrolyte to flow into the metal-air battery 601 through the input port 604. The pump mechanism can also cause the old electrolyte 602 to flow out of the metal-air battery 601 through the output port 605 and into a storage reservoir (e.g., the storage reservoir being external to the aftermarket rechargeable zinc-air battery) to be recycled 603. This replacement (e.g., aftermarket retrofit) of electrolyte in a pre-existing battery can be repeated multiple times.

Figure 7:
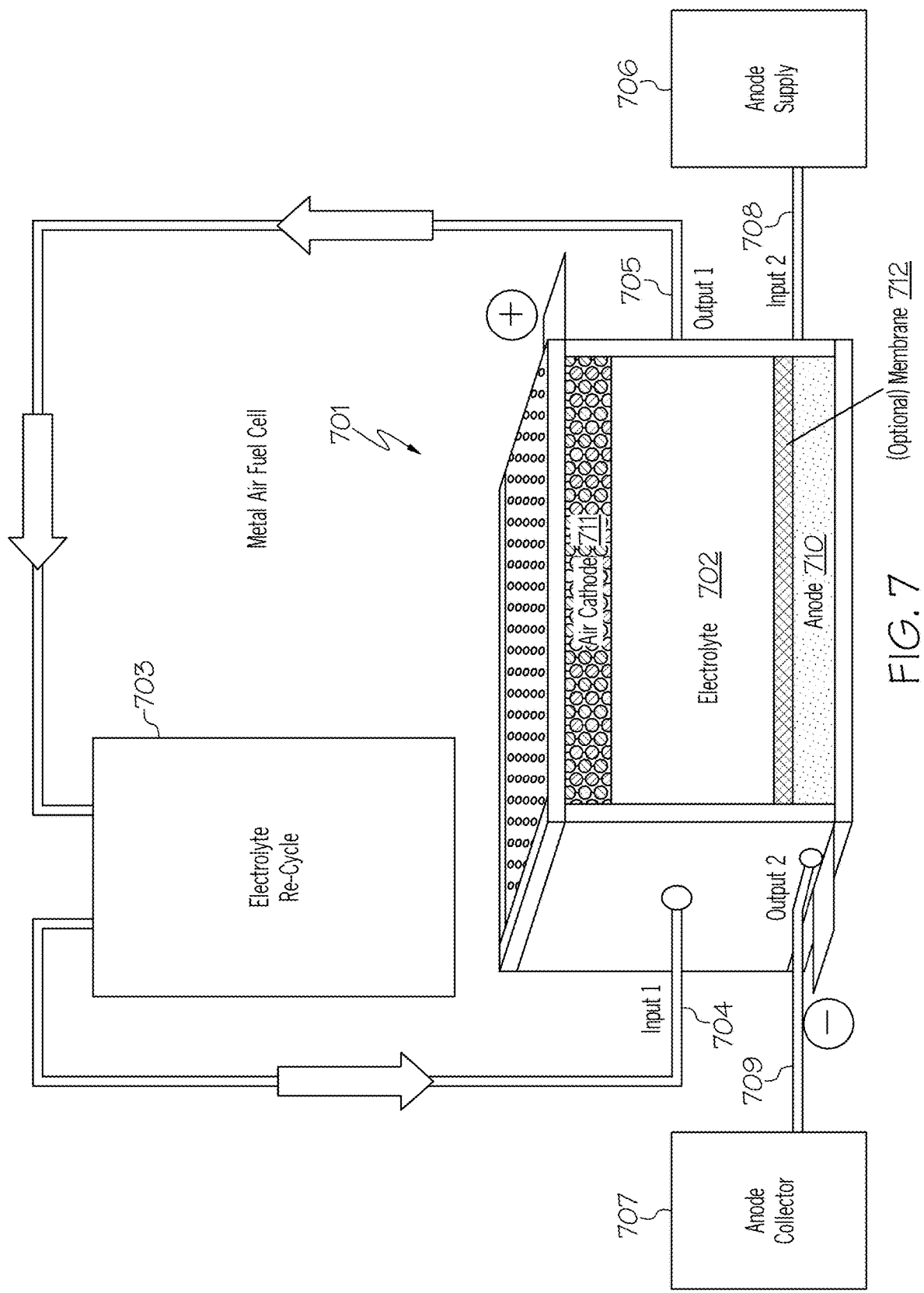
FIG. 7 illustrates an example metal-air-fuel-cell including an anode slurry replacement process, according to various embodiments of the invention.

FIG. 7 illustrates an example replacement process for replacing the electrolyte 702 in an electrolyte reservoir in a metal-air-fuel-cell 701 in which the electrolyte 702 separates an air cathode 711 from an anode 710. FIG. 7 also illustrates an example process for replacing the anode 710, as will be discussed below.

The replacement of the electrolyte 702 can take place, for example, once the electrolyte 702 has experienced electrolyte loss or loss of liquid and is not performing within required levels. The replacement electrolyte, in one example process, flows into the electrolyte reservoir in the metal-air-fuel cell 701 through a first input port 704. The old (non-performing) electrolyte 702 flows out of the electrolyte reservoir in the metal-air fuel cell 701 via a first output port 705. The old electrolyte that flows out of the meal-air-fuel-cell can be captured in a storage reservoir (e.g., the storage reservoir being external to an aftermarket rechargeable zinc-air-fuel-cell) and recycled 703 for reuse, as shown in FIG. 7. According to one example process, a pump mechanism (not shown), which can include one or more pumps, can be used to cause the replacement electrolyte to flow into the metal-air-fuel-cell 701 through the input port 704. The pump mechanism can also cause the old electrolyte 602 to flow out of the metal-air-fuel-cell 701 through the output port 705 and into a storage reservoir (e.g., the storage reservoir being external to the aftermarket rechargeable zinc-air-fuel cell) to be recycled 703. This replacement of electrolyte in a metal-air-fuel-cell can be repeated multiple times.

FIG. 7 also illustrates a replacement process for replacing in a metal-air-fuel-cell 701 the anode 710 from an anode supply source 706. The anode replacement can take place, for example, once the anode 710 is not performing within required levels. The replacement fluid anode (e.g., "anode slurry" or "anode slurry material"), in one example process, flows from the anode slurry material supply source 706 via a second input port (e.g., anode slurry input port") 708 into the anode 710 (e.g., anode slurry reservoir) of the metal-air-fuel-cell 701. According to various embodiments, the second input port includes a controllable valve that allows selective input of anode replacement material (e.g., anode slurry material) flow into the anode reservoir in the metal-fuel cell. The old anode material flows out of the anode 710 (e.g., anode slurry reservoir) of the metal-air-fuel-cell 701 through a second output port (e.g., anode slurry output port") 709 into an anode slurry material collector 707 (e.g., and storage container). According to various embodiments, the second output port includes a controllable valve that allows selective output of old anode material (e.g., old anode slurry material) to flow out of the anode slurry reservoir and out of the metal-air-fuel-cell. The old anode slurry material can be captured in the anode slurry material collector 707 and transported to a recycling center (not shown) to be recycled for reuse. According to one example process, a pump mechanism (not shown), which can include one or more pumps, can be used to cause the replacement anode slurry material to flow into the metal-air-fuel-cell 701 through the second input port 708. The pump mechanism can also cause the old anode slurry material 710 to flow out (e.g., "flushing out used anode slurry material") of the metal-air-fuel-cell 701 through the second output port 709 and into an anode material collector 707 to be recycled, as has been mentioned above. This replacement of anode material in a metal-air-fuel-cell can be repeated multiple times. It should be noted that an optional separator membrane 712 can be used to separate the electrolyte 702 from the anode 710, as shown in FIG. 7. The membrane (separator) in a metal-air-fuel-cell 701 allows the transport of OH ions between the air cathode electrode 711 and the anode electrode 710 while providing a physical barrier between the two electrodes in order to prevent electrical short circuits.

Replacement of Electrolyte and of Anode Material in a Metal-Air-Fuel-Cell

A voltage-drop below a certain threshold voltage across the fuel-cell 701, or after a preset time indicates expiration of an electrolyte optimal performance time period and/or an expiration of an anode optimal performance time period can identify a need for an electrolyte replacement process and/or a need for an anode material replacement process. The battery 601 is renewed once the electrolyte 602 is replaced. Therefore, the fuel-cell 701 after renewal of the electrolyte 702, and/or after replacement of the anode material 710, can continue to provide the specified discharge voltage, and continue to provide recharge cycles. A pre-existing fuel-cell 701 can have the electrolyte and/or the anode material replaced (e.g., after-market retrofit) multiple times. This renewal of electrolyte 702 and/or anode material 710 in a fuel-cell 701 can be also referred to as re-fueling the fuel-cell 701 or retrofitting the electrolyte and/or the anode material 710 in the fuel-cell 701.

Moreover, the re-fueling of a pre-existing fuel-cell 701 can be performed aftermarket (after manufacture of the battery). Therefore, a fuel-cell 701 can benefit from aftermarket retrofitting of the electrolyte and/or the anode material 710 in the fuel-cell 701. In certain embodiments, the fuel-cell 701 can continue to be operational while the retrofit operation re-fuel's the fuel-cell 701. That is, a pre-existing fuel-cell 701 would not have to cease its use in an application to contemporaneously perform an aftermarket retrofit operation of the electrolyte 702 in the fuel-cell 701. It is also contemplated that, in certain embodiments, a pre-existing fuel-cell 701 would not have to cease its continuous use (or nearly-continuous use) in an application to contemporaneously perform an aftermarket retrofit operation of the anode material 710 in the fuel-cell 701. Such an aftermarket retrofit operation can be especially useful in certain applications which demand continuous (or nearly-continuous) long-term use of a fuel-cell 70. A fuel-cell 701 including such a feature can also be referred to as a continuous long term use refuellable fuel-cell 701.

Example Configuration 1

An Advanced Rechargeable Zinc-Air-Battery based on the enhanced cathode wherein:
The gas diffusion layer separates oxygen and delivers the oxygen to the electrocatalyst layer; and
  the enhanced cathode material is applied onto nickel foam at the cathode and electrolyte interface; and
  where the anode of the Zinc-Air-Battery is comprised of one or more: Zinc, zinc/carbon nanoparticles, doped zinc/carbon nano particles; and
  an electrolyte of one or more electrolyte materials selected from a liquid electrolyte, a gel-polymer, a combination of gel-polymer on the cathode interface and solid polymer on the anode interface, an advanced solid polymer combined with a metal-organic-framework, an advanced solid polymer comprised of one or more polymers and conductive additives and deep eutectic solvent (DES); and
  a porous membrane is submersed in the electrolyte and separates the cathode and anode from direct electrical connectivity while allowing the transport of OH− ions between the cathode and anode; and
  this configuration enables the Zinc-Air-Battery to discharge using the oxygen reduction reaction (ORR) function and recharge the zinc-air-battery using the oxygen evolution reaction (OER) function of the electrocatalyst; and
  here the recharge cycles are estimated at over 2,000; and
  where potential specific energy density is in excess of 600 Wh/kg; and
  with a cell voltage of between 2.0 volts and 4.0 volts.

Example Configuration 2

An Advanced Rechargeable Zinc-Air Battery based on the enhanced cathode wherein:

The gas diffusion layer separates oxygen and delivers the oxygen to the electrocatalyst layer; and the enhanced cathode material is applied onto nickel foam at one or both the air interface and the electrolyte interface; and where the anode of the Zinc-Air Battery is comprised of one or more: Zinc, zinc/carbon nanoparticles, doped zinc/carbon nano particles; and where two electrolyte types are applied, one on each side of the separator with one electrolyte type interfacing the cathode and another electrolyte type interfacing the anode;

where the one or more electrolyte materials are comprised of a liquid electrolyte, a gel-polymer, a combination of gel-polymer on the cathode interface and solid polymer on the anode interface, an advanced solid polymer combined with a metal-organic-framework, an advanced solid polymer comprised of one or more polymers and conductive additives and deep eutectic solvent (DES); and an electrolyte of one or more electrolyte materials from Sodium Hydroxide (NaOH), Potassium Hydroxide (KOH), and Zinc Chloride ($ZnCl_2$), suspended in water ($H_2O$), is applied in between the anode and cathode; and a porous membrane is submersed in the electrolyte that separates the two electrolyte types and separates the cathode and anode from direct electrical connectivity while allowing the transport of $OH^-$ ions between the cathode and anode; and this configuration enables the Zinc-Air Battery to discharge using the oxygen reduction reaction (ORR) function and recharge the zinc-air battery using the oxygen evolution reaction (OER) function of the electrocatalyst; and where the recharge cycles are estimated at over 2,000; and where potential specific energy density is in excess of 600 Wh/kg; and with a cell voltage of between 2.0 volts and 3.2 volts.

Example Configuration 3

An Advanced Zinc-Air Battery based on the enhanced cathode wherein the zinc air battery is flexible and is comprised of:

The gas diffusion layer separates oxygen and delivers the oxygen to the electrocatalyst layer; and the enhanced cathode material is applied onto nickel foam at the cathode at one or both the air interface and the electrolyte interface; and where the anode of the Zinc-Air Battery is comprised of one or more: Zinc, zinc/carbon nanoparticles, doped zinc/carbon nano particles; and where an electrolyte is absorbed into the separator and the separator interfaces both the cathode and anode; and an electrolyte of one or more electrolyte materials selected from: a liquid electrolyte, a gel-polymer, a combination of gel-polymer on the cathode interface and solid polymer on the anode interface, an advanced solid polymer, combined with a metal-organic-framework, an advanced solid polymer, comprised of one or more polymers, and conductive additives, and deep eutectic solvent (DES); and a porous membrane is submersed in the electrolyte that separates the two electrolyte types and separates the cathode and anode from direct electrical connectivity while allowing the transport of $OH^-$ ions between the cathode and anode; and this configuration enables the Zinc-Air Battery to discharge using the oxygen reduction reaction (ORR) function and recharge the zinc-air-battery using the oxygen evolution reaction (OER) function of the electrocatalyst; and where the recharge cycles are estimated at over 2,000; and where potential specific energy density in excess of 600 Wh/kg, and with a cell voltage of between 2.0 volts and 3.2 volts.

Example Configuration 4

An Advanced Zinc-Air Battery based on the enhanced cathode wherein:

the zinc-air battery uses a double layer configuration and is comprised of:

The gas diffusion layer which separates oxygen and delivers the oxygen to the electro-catalyst layer; and the enhanced cathode material is applied onto nickel foam at one or both the air interface and the electrolyte interface; and the cathode and electrolyte interface; and where the anode of the Zinc-Air Battery is comprised of one or more selected from: Zinc, zinc/carbon nanoparticles, or doped zinc/carbon nano particles; and an electrolyte of one or more electrolyte materials selected from: a liquid electrolyte, a gel-polymer, a combination of gel-polymer on the cathode interface and solid polymer on the anode interface, an advanced solid polymer combined with a metal-organic-framework, or an advanced solid polymer comprised of one or more polymers and conductive additives and deep eutectic solvent (DES); and a porous membrane is submersed in the electrolyte and separates the cathode and anode from direct electrical connectivity while allowing the transport of OH– ions between the cathode and anode; and an additional electrolyte and air cathode configuration is applied on the opposite side of the zinc anode to form a double layer metal air battery.

This configuration enables the Zinc-Air Battery to discharge using the oxygen reduction reaction (ORR) function and recharge the zinc-air battery using the oxygen evolution reaction (OER) function of the electrocatalyst; and where the recharge cycles are estimated at over 2,000; and where potential specific energy density in excess of 600 Wh/kg;

with a cell voltage of between 2.0 volts and 4.0 volts.

An advanced zinc-air battery based on the enhanced cathode, includes one or more electrolyte(s) in one or more electrolyte reservoirs in the battery, which such electrolyte(s) can be replaced after any one or more of:

1) the recharge cycles have depleted the electrolytes' ability to recharge, 2) a voltage across the battery is measured to be reduced below a predefined threshold, or 3) a preset time indicates expiration of an electrolyte optimal performance time period.

In certain embodiments, the zinc-air battery (e.g., a rechargeable zin-air battery) can include an input port coupled to the electrolyte reservoir. The input port can include a control valve mechanism that can be actuated to open for selective in-flow of fresh electrolyte into the electrolyte reservoir in a pre-existing battery. The rechargeable zinc-air battery can include an output-port coupled to the electrolyte reservoir. The output port can include a control valve mechanism that can be actuated to open for selective out-flow of electrolyte from the electrolyte reservoir in the pre-existing battery. After re-fueling the rechargeable zinc-air battery by filling the fresh electrolyte into the electrolyte reservoir in the rechargeable zinc-air battery, both the control valve mechanism in the input port and the control valve mechanism in the output port can be actuated and closed.

The replaced (e.g., refueled in the battery) one or more electrolyte(s) enable a new round of efficient recharge cycles for the pre-existing rechargeable zinc-air battery, which such replacement can be repeatedly performed as an aftermarket retrofit of fresh electrolyte in a pre-existing rechargeable zinc-air battery. This replacement process enables a new efficient repeatable recharge process in the pre-existing battery. A rechargeable zinc-air battery can be configured to allow an aftermarket retrofit replacement of fresh electrolyte in the battery thereby refreshing the zinc-air battery to provide more discharge/charge cycles and extending the usable life of the rechargeable zinc-air battery. In certain embodiments this replacement process can be performed on a zinc-air battery while the battery is contemporaneously in continuous use in an application.

As an example, an air cathode, an anode, a separator, and an electrolyte reservoir, are configured in a rechargeable zinc-air battery to allow aftermarket replacement of fresh electrolyte in the electrolyte reservoir in the pre-existing battery contemporaneous with use of the rechargeable zinc-air battery in an application requiring the pre-existing battery to discharge current into a target device or system.

Additionally, a rechargeable zinc-air battery including this re-fueling feature can be referred to as a continuous long-term use refuellable and rechargeable zinc-air battery. The rechargeable zinc-air battery includes a configuration that allows an aftermarket retrofit replacement of fresh electrolyte in the battery thereby refreshing the zinc-air battery to provide more discharge/charge cycles and extending the usable life of the rechargeable zinc-air battery. This re-fueling process can be performed even while contemporaneously the pre-existing rechargeable zinc-air battery is in continuous use in an application requiring the pre-existing rechargeable zinc-air battery to discharge current into a target device or system.

Various Example Embodiments (A) According to various embodiments of the invention, an advanced metal-air-fuel-cell comprises:
one or more advanced air cathodes, a metal anode, a separator, and one or more electrolyte layers which are interposed between the one or more advanced air cathodes and the metal anode, and which conduct metal ions between the advanced air cathode and the metal anode,
wherein the advanced air cathode includes a gas diffusion layer, an electroconductive material, and an electrocatalyst layer; and
wherein the gas diffusion layer diffuses oxygen from ambient air providing oxygen to the electrocatalyst layer; and
an electrocatalyst layer being applied to the advanced air cathode of the advanced metal-air-fuel-cell:
wherein a base electrocatalyst material in the electrocatalyst layer is comprised of a modified perovskite material comprised of Calcium Copper Titanium Oxide $(Ca_jCu_kTi_lO_m,)$ where j, k, l, and m, are within a range of 0 to 20; and
wherein the base electrocatalyst material is an internal barrier capacitor material having grain boundaries that provide electrocatalyst properties and first and second resistive materials bonded to the grain boundaries of the base electrocatalyst material to form modified grain boundaries of the base electrocatalyst material thereby forming a modified internal barrier capacitor material; and
wherein one or more additional oxide materials are bonded to the grain boundaries of the internal barrier capacitor material forming a grain boundary composition which includes nanoparticles of a first resistive material added to nanoparticles of the internal barrier capacitor material, increasing performance of the electrocatalyst layer; and
wherein the base electrocatalyst material is combined with active carbon and one or more ionomers to form the electrocatalyst layer, and
wherein the electrocatalyst layer interfaces with electrolyte of the one or more electrolyte layers of the advanced metal-air-fuel-cell and performs bifunctional processes of oxygen reduction reaction (ORR) forming hydroxyl ions which migrate into the electrolyte; and
wherein a reversible reaction takes place at the electrocatalyst layer when charging release of $O_2$ molecules (OER); and
wherein the electrolyte is comprised of one or more selected from:
a liquid electrolyte,
a gel-polymer electrolyte,
a combination of gel-polymer on an interface of the advanced air cathode and solid polymer on an interface of the metal anode, an advanced solid polymer combined with a metal-organic-framework,
an advanced solid polymer comprised of one or more polymers and conductive additives, or a deep eutectic solvent; and
wherein the metal anode comprises an anode slurry of metal particles suspended in an electrolyte in an anode slurry reservoir, and
wherein the metal particles consist of one or more of the following metals: aluminum, germanium, calcium, iron, lithium, magnesium, potassium, sodium, tin and zinc; and
wherein the metal-air-fuel-cell includes at least one anode slurry port mechanically coupled to the anode slurry reservoir, through-which anode slurry material is replenished in the anode slurry reservoir thereby enabling the metal-air-fuel-cell to continuously generate power.

(B) The advanced metal-air-fuel-cell of example (A) above, wherein each of the metal particles in the anode slurry have a coating to reduce or prevent dendrite formation.

(C) The advanced metal-air-fuel-cell of example (A) above, wherein the anode slurry reservoir is positioned at the bottom of the advanced metal-air-fuel-cell with the one or more air cathodes and the one or more electrolyte layers disposed directly above the anode slurry reservoir; and
wherein the at least one anode slurry port comprises an anode slurry input port and an anode slurry output port, the anode slurry input port configured to allow anode slurry material to flow through the anode slurry input port into the anode slurry reservoir and across a bottom of the metal air fuel-cell and to settle and coat onto one or more anode current collector(s), and the anode slurry output port configured to allow anode slurry material to flow out of the anode slurry reservoir and through the anode slurry output port and out of the metal-air-fuel-cell.

(D) The advanced metal-air-fuel-cell of example (C), wherein the anode slurry material flows through the anode slurry input port and into the anode slurry reservoir and anode slurry material settles and coats the one or more anode current collectors while flushing out used anode slurry material from the anode slurry reservoir through the anode slurry output port.

(E) The advanced metal-air-fuel-cell of example (A), wherein the anode slurry reservoir is positioned at the bottom of the advanced metal-air-fuel-cell with the one or more air cathodes and the one or more electrolyte layers disposed directly above the anode slurry reservoir, and wherein a membrane is interposed between the one or more electrolyte layers and the anode slurry reservoir in the advanced metal-air-fuel-cell.

(F) The advanced metal-air-fuel-cell of example (A), wherein the electrolyte in the anode slurry is fluid and is based on one of: an aqueous electrolyte or a gel type electrolyte of higher viscosity than the aqueous electrolyte.

(G) The advanced metal-air-fuel-cell of example (A), wherein the metal particles suspended in the electrolyte in the anode slurry are designed and fabricated to be recycled by heating the anode slurry to cause
- any dendrite formations on the metal particles to fuse and melt, and
- any corrosion along with the electrolyte to evaporate, thereby allowing the recycled metal particles to be applied to a fresh electrolyte solution forming a new anode slurry for use in the advanced metal-air-fuel-cell.

(H) The advanced metal-air-fuel-cell of example (A), comprising:
- an electrolyte input port mechanically coupled to an electrolyte reservoir containing the one or more electrolyte layers and an electrolyte output port mechanically coupled to the electrolyte reservoir;
- an anode slurry input port mechanically coupled to the anode slurry reservoir containing anode slurry material and an anode slurry output port mechanically coupled to the anode slurry reservoir; and
- wherein the one or more advanced air cathodes, the metal anode, the separator, the one or more electrolyte layers, the anode slurry input port, the anode slurry output port, and the anode slurry reservoir, are configured in the advanced metal-air-fuel-cell to allow flushing out anode slurry from the anode slurry reservoir via the anode slurry output port, and after-market replenishment of replacement anode slurry material into the anode slurry reservoir via the anode slurry input port, allowing contemporaneous and continuous use of the advanced metal-air-fuel-cell which is a refuellable metal-air-fuel-cell.

(I) The advanced metal-air-fuel-cell of example (A), wherein the metal particles suspended in an aqueous electrolyte in the anode slurry come into contact with one or more charge collectors (electrodes) and provide a replaceable anode in the advanced metal-air-fuel-cell; and
- wherein one or more gelling agent(s) are applied in the anode slurry thereby assisting in suspending the metal particles, enhancing electrochemical performance, and helping to establish a desired metal slurry viscosity for the replaceable anode in a metal-air-fuel-cell.

(J) The advanced metal-air-fuel-cell of example (I), wherein the one or more gelling agent(s) are applied in the anode slurry comprising magnesium for a magnesium-air-fuel-cell comprising polyacrylic acid an anionic polyelectrolyte and magnesium aluminum silicate clay which is a gel forming clay that reduces anode corrosion and enhances electrochemical performance.

(K) The advanced metal-air-fuel-cell of example (J), wherein the magnesium-air-fuel-cell is based on high conductivity alkaline electrolytes including one or more of: KOH, LiOH and NaOH.

(L) The advanced metal-air-fuel-cell of example (I), wherein the one or more gelling agent(s) are applied in the anode slurry comprising zinc for a zinc-air-fuel-cell comprising polyacrylic acid an anionic polyelectrolyte and magnesium aluminum silicate clay which is a gel forming clay that reduces anode corrosion and enhances electrochemical performance.

(M) The advanced metal-air-fuel-cell of example (L), wherein the zinc-air-fuel-cell is based on high conductivity alkaline electrolytes including one or more of: KOH, LiOH and NaOH.

(N) The advanced metal-air-fuel-cell of example (A), wherein the anode comprises a metal foam porous anode that allows electrolyte to be absorb into the metal foam porous anode, which significantly extends a life cycle of the anode by at least hundreds of thousands of hours.

(O) The advanced metal-air-fuel-cell of example (A), wherein a size of each metal particle in the anode slurry ranges from 20 microns to 100 microns, measured along a critical dimension.

(P) According to various embodiments of the invention, provided is a method of using an aftermarket refuellable metal-air-fuel-cell including electrolyte in an electrolyte reservoir, wherein the electrolyte is interposed between an air cathode disposed directly above an anode, which conduct metal ions between the air cathode and the anode, an input port has a first control valve and an output port has a second control valve, both the input port and the output port being respectively coupled to the electrolyte reservoir, the method comprising:
- actuating and opening the first control valve to permit in-flow of a replacement electrolyte into the electrolyte reservoir; actuating and opening the second control valve to permit out-flow of electrolyte from the electrolyte reservoir and into a storage reservoir external to the aftermarket refuellable metal-air-fuel-cell, thereby filling the electrolyte reservoir with the replacement electrolyte;
- actuating and closing the first control valve; and
- actuating and closing the second control valve, thereby the electrolyte reservoir being aftermarket retrofit filled with replacement electrolyte and the aftermarket refuellable metal-air-fuel-cell being refueled to provide more discharge/charge cycles and extending a usable life of the aftermarket refuellable metal-air-fuel-cell.

(Q) The method of example (P), further comprising:
- aftermarket retrofit replacement of the replacement electrolyte in the electrolyte reservoir in the aftermarket refuellable metal-air-fuel-cell contemporaneous with continuous use of the aftermarket refuellable metal-air-fuel-cell in an application requiring the aftermarket refuellable metal-air-fuel-cell to discharge current into a target device or system.

(R) According to various embodiments of the invention, provided is a method of using an aftermarket refuellable metal-air-fuel-cell including an anode comprising anode slurry in an anode slurry reservoir, wherein the anode slurry is located in a bottom portion of the aftermarket refuellable metal-air-fuel-cell with a porous membrane disposed directly above the anode and between the anode and electrolyte in an electrolyte reservoir disposed directly above the porous membrane, and an air cathode disposed directly above the electrolyte in the electrolyte reservoir, which conduct metal ions between the air cathode and the anode, and an anode slurry input port has a first control valve and an anode slurry output port has a second control valve, both the anode slurry input port and the anode slurry output port being respectively coupled to the anode slurry reservoir, the method comprising:

actuating and opening the first control valve to permit in-flow of a replacement anode slurry material into the anode slurry reservoir via the anode slurry input port; and actuating and opening the second control valve to permit out-flow of anode slurry from the anode slurry reservoir and into a storage reservoir external to the aftermarket refuellable metal-air-fuel-cell, thereby filling the anode slurry reservoir with the replacement anode slurry material, and actuating and closing both the first control valve and the second control valve, and actuating and closing both the first control valve and the second control valve, thereby the anode slurry reservoir being aftermarket retrofit filled with replacement anode slurry and the aftermarket refuellable metal-air-fuel-cell being refueled to provide more discharge/charge cycles and extending a usable life of the aftermarket refuellable metal-air-fuel-cell.

(S) The method of example (R), further comprising:

aftermarket retrofit replacement of the replacement anode slurry material in the anode slurry reservoir in the aftermarket refuellable metal-air-fuel-cell contemporaneous with continuous use of the aftermarket refuellable metal-air-fuel-cell in an application requiring the aftermarket refuellable metal-air-fuel-cell to discharge current into a target device or system.

The above applications do not represent the limits of the various embodiments of the present invention, and many additional applications can be envisioned by one of ordinary skill in view of the disclosure herein.

The features and advantages described in the specification are not all inclusive, and particularly, many additional features and advantages will be apparent to one of ordinary skill in the art in view of the description, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

The description of the present invention has been presented for purposes of illustration and description of examples but is not intended to be exhaustive or limited to the invention in the examples and the form disclosed. Many modifications and variations will be apparent to those of ordinary skill in the art without departing from the scope of the invention. Each embodiment was chosen and described in order to best explain the principles of the invention and the practical application and to enable others of ordinary skill in the art to understand the invention for various embodiments with various modifications as are suited to the particular use contemplated.

What is claimed is:

1. An advanced rechargeable metal-air battery comprising:

one or more advanced air cathodes, an anode, a separator, and one or more electrolyte layers which are interposed between the advanced air cathode and the anode, and which conduct metal ions between the advanced air cathode and the anode, wherein the advanced air cathode includes a gas diffusion layer, an electroconductive material, and an electrocatalyst layer; and wherein the gas diffusion layer diffuses oxygen from ambient air providing oxygen to the electrocatalyst layer; and an electrocatalyst layer being applied to the advanced air cathode of the advanced rechargeable metal-air battery:

wherein a base electrocatalyst material in the electrocatalyst layer is comprised of a modified perovskite material comprised of Calcium Copper Titanium Oxide ($Ca_jCu_kTi_lO_m$,) where j, k, l, and m, are within a range of 0 to 20; and wherein the base electrocatalyst material is an internal barrier capacitor material having grain boundaries that provide electrocatalyst properties and first and second resistive materials bonded to the grain boundaries of the base electrocatalyst material to form modified grain boundaries of the base electrocatalyst material thereby forming a modified internal barrier capacitor material; and wherein one or more additional oxide materials are bonded to the grain boundaries of the internal barrier capacitor material forming a grain boundary composition which includes nanoparticles of a first resistive material added to nanoparticles of the internal barrier capacitor material, increasing performance of the electrocatalyst layer; and wherein the base electrocatalyst material is combined with active carbon and one or more ionomers to form the electrocatalyst layer, and wherein the electrocatalyst layer interfaces with electrolyte of the one or more electrolyte layers of the advanced rechargeable metal-air battery and performs bifunctional processes of oxygen reduction reaction (ORR) forming hydroxyl ions which migrate into the electrolyte; and wherein a reversible reaction takes place at the electrocatalyst layer when charging release of $O_2$ molecules (OER); and wherein the electrolyte is comprised of one or more selected from:

a liquid electrolyte, a gel-polymer electrolyte, a combination of gel-polymer on an interface of the advanced air cathode and solid polymer on an interface of the anode, an advanced solid polymer combined with a metal-organic-framework, an advanced solid polymer comprised of one or more polymers and conductive additives, or a deep eutectic solvent, and wherein the anode is comprised of one or more of: aluminum, germanium, calcium, iron, lithium, magnesium, potassium, sodium, tin, or zinc.

2. The advanced rechargeable metal-air battery of claim 1, wherein the electrocatalyst layer comprises modified perovskite material including nanoparticle groupings of less than 100 nm in size measured along a critical dimension thereby having increased electrocatalyst layer surface area.

3. The advanced rechargeable metal-air battery of claim 1, wherein the base electrocatalyst material includes the second resistive material which is a second oxide material that is bonded to grain boundaries of the grain boundary composition forming a modified internal barrier capacitor material which includes nanoparticles of the second resistive material added to nanoparticles of the grain boundary composition, increasing performance of the electrocatalyst layer.

4. The advanced rechargeable metal-air battery of claim 1, wherein the internal barrier capacitor material includes the first and second resistive materials which are first and second oxide materials, the first oxide material being an aluminum oxide and the second oxide material being a silicon oxide.

5. The advanced rechargeable metal-air battery of claim 1, wherein the internal barrier capacitor material comprises the Calcium Copper Titanium Oxide material combined with one or more of Al, Ti, Pt, Pt alloys, Ru, Carbon, Mn, Mg, Sr, and organic materials, or a combination thereof.

6. The advanced rechargeable metal-air battery of claim 1, wherein the electrocatalyst layer includes the modified internal barrier capacitor material which has one or more element(s) formed around another element that is embedded within the one or more elements forming a core shell element structure.

7. The advanced rechargeable metal-air battery of claim 1, wherein the advanced electrocatalyst layer applied to the advanced air cathode includes an M-CCTO electrocatalyst material deposited on a porous electrically conductive and hydrophobic material including nickel foam.

8. The advanced rechargeable metal-air battery of claim 1, wherein the anode is a zinc anode comprising nanoparticles having a core shell structure comprising a zinc core with a carbon shell in the nanoparticles of less than 2 microns in size measured along a critical dimension, which allow hydroxyl ions to pass through the carbon shell while restricting zinc ions passing from the zinc core through the carbon shell thereby mitigating degradation and dendrite growth to improve rechargeability.

9. The advanced rechargeable metal-air battery of claim 8, wherein the nanoparticles include additional structures applied to an outer surface of the carbon shell including one or more of: nitrogen, sulfur, oxygen, conductive agents, metal hydroxides, metal oxides, metal alloys, or metal complexes, or a combination thereof.

10. The advanced rechargeable metal-air battery of claim 1, wherein the advanced rechargeable metal-air battery is an advanced rechargeable zinc-air battery, and wherein:
a) the gas diffusion layer separates oxygen and delivers the oxygen to the electrocatalyst layer;
b) the advanced air cathode comprises material using M-CCTO as a catalyst applied onto nickel foam at a cathode and electrolyte interface;
c) the anode comprises one or more of: Zinc, zinc/carbon nanoparticles, or doped zinc/carbon nano particles;
d) the electrolyte of the one or more electrolyte layers comprises one or more of: a liquid electrolyte, a gel-polymer, a combination of gel-polymer on an interface of the cathode and solid polymer on an interface of the anode, an advanced solid polymer combined with a metal-organic-framework, an advanced solid polymer comprised of one or more polymers, conductive additives, or a deep eutectic solvent (DES);
e) the separator comprises a porous membrane submersed in the electrolyte and which separates the cathode and anode from direct electrical connectivity while allowing transport of $OH^-$ ions between the cathode and anode;
f) the advanced rechargeable zinc-air battery is configured to discharge using an oxygen reduction reaction (ORR) function and recharge using an oxygen evolution reaction (OER) function of the electrocatalyst layer;
g) the advanced rechargeable zinc-air battery is configured to reliably perform more than 2000 discharge and charge cycles;
h) a potential specific energy density of the advanced rechargeable zinc-air battery is in excess of 600 Wh/kg; and
i) a cell voltage of the advanced rechargeable zinc-air battery is between 2.0 volts and 4.0 volts.

11. The advanced rechargeable metal-air battery of claim 1, wherein the advanced rechargeable metal-air battery is an advanced rechargeable zinc-air battery, and wherein:
a) the gas diffusion layer separates oxygen and delivers oxygen to the electrocatalyst layer;
b) the advanced air cathode comprises material using M-CCTO as a catalyst applied onto nickel foam at a cathode and electrolyte interface;
c) the anode comprises one or more of: Zinc, zinc/carbon nanoparticles, or doped zinc/carbon nano particles;
d) the one or more electrolyte layers are two electrolyte types applied one on each side of the separator with one electrolyte type interfacing the cathode and another electrolyte type interfacing the anode;
e) the one or more electrolyte layers comprise one or more of: a liquid electrolyte, a gel-polymer, a combination of gel-polymer on an interface of the cathode and solid polymer on an interface of the anode, an advanced solid polymer combined with a metal-organic-framework, an advanced solid polymer comprised of one or more polymers, conductive additives, and a deep eutectic solvent (DES);
f) the electrolyte comprises one or more electrolyte materials selected from: NaOH, KOH, and $ZnC_2$ suspended in $H_2O$, and applied in between the anode and cathode;
g) the separator comprises a porous membrane submersed in the electrolyte and which separates the cathode and anode from direct electrical connectivity while allowing transport of $OH^-$ ions between the cathode and anode;
h) the advanced rechargeable zinc-air battery is configured to discharge using an oxygen reduction reaction (ORR) function and recharge using an oxygen evolution reaction (OER) function of the electrocatalyst layer;
the advanced rechargeable zinc-air battery is configured to reliably perform more than 2000 discharge and charge cycles;
j) a potential specific energy density of the advanced rechargeable zinc-air battery is in excess of 600 Wh/kg; and
k) a cell voltage of the advanced rechargeable zinc-air battery is between 2.0 volts and 3.2 volts.

12. The advanced rechargeable metal-air battery of claim 1, wherein the advanced rechargeable metal-air battery is an advanced rechargeable zinc-air battery, and wherein the advanced rechargeable zinc-air battery is flexible, and wherein:
  a) the gas diffusion layer separates oxygen and delivers the oxygen to the electrocatalyst layer;
  b) the advanced air cathode comprises material using M-CCTO as a catalyst applied onto nickel foam at a cathode and electrolyte interface;
  c) the anode comprises one or more of: Zinc, zinc/carbon nanoparticles, or doped zinc/carbon nano particles;
  d) an electrolyte is absorbed into the separator and the separator provides an interface to both the cathode and the anode;
  e) the electrolyte of the one or more electrolyte layers comprises one or more of; a liquid electrolyte, a gel-polymer, a combination of gel-polymer on an interface of the cathode and solid polymer on an interface of the anode, an advanced solid polymer combined with a metal-organic-framework, an advanced solid polymer comprised of one or more polymers, conductive additives, or a deep eutectic solvent (DES);
  f) the separator comprises a porous membrane submersed in the electrolyte and which separates the cathode and anode from direct electrical connectivity while allowing transport of OH" ions between the cathode and anode;
  g) the advanced rechargeable zinc-air battery is configured to discharge using an oxygen reduction reaction (ORR) function and recharge using an oxygen evolution reaction (OER) function of the electrocatalyst layer;
  h) the advanced rechargeable zinc-air battery is configured to reliably perform more than 2000 discharge and charge cycles;
  a potential specific energy density of the advanced rechargeable zinc-air battery is in excess of 600 Wh/kg; and
  a cell voltage of the advanced rechargeable zinc-air battery is between 2.0 volts and 4.0 volts.

13. The advanced rechargeable metal-air battery of claim 1, wherein the advanced rechargeable metal-air battery is an advanced rechargeable zinc-air battery, and wherein the advanced rechargeable zinc-air battery is configured as a double layer metal-air battery, and wherein:
  a) the gas diffusion layer separates oxygen and delivers oxygen to the electrocatalyst layer;
  b) the advanced air cathode comprises material using M-CCTO as a catalyst applied onto nickel foam at one or both of a cathode air interface and an electrolyte interface;
  c) the anode comprises one or more of: Zinc, zinc/carbon nanoparticles, or doped zinc/carbon nano particles;
  d) the electrolyte of the one or more electrolyte layers comprises one or more of: a liquid electrolyte, a gel-polymer, a combination of gel-polymer on an interface of the advanced air cathode and a solid polymer on an interface of the anode, an advanced solid polymer combined with a metal- organic-framework, an advanced solid polymer comprised of one or more polymers, conductive additives, or a deep eutectic solvent (DES);
  e) the separator comprises a porous membrane submersed in the electrolyte and which separates the advanced air cathode and anode from direct electrical connectivity while allowing transport of OH" ions between the advanced air cathode and anode;
  f) an additional electrolyte and air cathode configuration is applied on an opposite side of the anode to form a double layer metal-air battery;
  g) the advanced rechargeable zinc-air battery is configured to discharge using an oxygen reduction reaction (ORR) function and recharge using an oxygen evolution reaction (OER) function of the electrocatalyst layer;
  h) the advanced rechargeable zinc-air battery is configured to reliably perform more than 2000 discharge and charge cycles;
  i) a potential specific energy density of the advanced rechargeable zinc-air battery is in excess of 600 Wh/kg; and
  a cell voltage of the advanced rechargeable zinc-air battery is between 2.0 volts and 4.0 volts.

14. The advanced rechargeable metal-air battery of claim 1, wherein the advanced rechargeable metal-air battery is an advanced rechargeable zinc-air battery configured with an input port coupled to an electrolyte reservoir in the battery to allow selective in-flow of electrolyte into the electrolyte reservoir in the advanced rechargeable zinc-air battery and an output port coupled to the electrolyte reservoir to allow selective out-flow of electrolyte from the electrolyte reservoir in the advanced rechargeable zinc-air battery, to replace the one or more electrolyte(s) in a pre-existing advanced rechargeable zinc-air battery with new replacement electrolyte(s).

15. The advanced rechargeable metal-air battery of claim 14, wherein the input port, the electrolyte reservoir, and the output port, of the advanced rechargeable zinc-air battery are configured to allow repeated aftermarket replacement of the electrolyte(s) in a pre-existing aftermarket advanced rechargeable zinc-air battery, for continued use with a new round of recharge cycles.

16. The advanced rechargeable metal-air battery of claim 1, wherein the anode is coated with a protective layer consisting of nano-sized hydrophilic metal-organic frameworks (MOF's) on a surface of the anode to improve physical and electrical interconnectivity between the electrolyte and the anode.

* * * * *